US012360747B1

(12) United States Patent
Geusz et al.

(10) Patent No.: US 12,360,747 B1
(45) Date of Patent: Jul. 15, 2025

(54) DEVICES AND METHODS FOR VISUAL PROGRAMMING

(71) Applicant: Apple Inc., Cupertino, CA (US)

(72) Inventors: Eric Geusz, San Francisco, CA (US); Jeremy Ray Bernstein, San Francisco, CA (US); Novaira Masood, San Jose, CA (US); Pravalika Avvaru, Milpitas, CA (US)

(73) Assignee: Apple Inc., Cupertino, CA (US)

(*) Notice: Subject to any disclaimer, the term of this patent is extended or adjusted under 35 U.S.C. 154(b) by 121 days.

(21) Appl. No.: 17/376,062

(22) Filed: Jul. 14, 2021

Related U.S. Application Data

(60) Provisional application No. 63/052,418, filed on Jul. 15, 2020.

(51) Int. Cl.
| | |
|---|---|
| *G06F 8/34* | (2018.01) |
| *G06F 3/01* | (2006.01) |
| *G06F 3/04842* | (2022.01) |

(52) U.S. Cl.
CPC .............. *G06F 8/34* (2013.01); *G06F 3/013* (2013.01); *G06F 3/017* (2013.01); *G06F 3/04842* (2013.01)

(58) Field of Classification Search
CPC . G06F 8/34; G06F 3/013; G06F 3/017; G06F 3/04842
See application file for complete search history.

(56) References Cited

U.S. PATENT DOCUMENTS

| | | | | |
|---|---|---|---|---|
| 5,758,122 A | * | 5/1998 | Corda ................. | G06F 8/34 717/125 |
| 8,489,984 B1 | * | 7/2013 | Violet ................. | G06F 8/34 715/251 |
| 9,143,770 B2 | * | 9/2015 | Bennett ............... | H04N 13/31 |
| (Continued) | | | | |

FOREIGN PATENT DOCUMENTS

WO    WO-2019026357 A1 *  2/2019  ............. G06F 11/32

OTHER PUBLICATIONS

WO 1019026357 A1, translation (Year: 2019).*
(Continued)

*Primary Examiner* — Patrick F Riegler
(74) *Attorney, Agent, or Firm* — Kubota & Basol LLP

(57) ABSTRACT

Visual programming provides an efficient and intuitive user experience in an enhanced reality computer-generated environment. In some embodiments, a graphical representation of a programming structure is displayed in a computer-generated environment, and various interactions with the graphical representation of the programming structure are provided to define behavior of objects in a computer-generated environment. In some embodiments, the behavior of the object is defined by a trigger and an action. In some embodiments, the various interactions include adding one or more graphical representations of programming objects to the graphical representation of the programming structure, removing one or more graphical representations of programming objects from the graphical representation of the programming structure or from the computer-generated environment, and/or previewing the behavior defined by the graphical representation of the programming structure.

24 Claims, 14 Drawing Sheets

(56) References Cited

U.S. PATENT DOCUMENTS

| | | | |
|---|---|---|---|
| 9,318,108 B2 | 4/2016 | Gruber et al. | |
| 10,048,748 B2 | 8/2018 | Sridharan et al. | |
| 10,452,360 B1* | 10/2019 | Burman | G06F 9/451 |
| 10,521,195 B1* | 12/2019 | Swope | G06F 9/54 |
| 11,119,735 B1* | 9/2021 | Baafi | G06F 8/33 |
| 11,269,889 B1* | 3/2022 | Aversano | G06F 16/2458 |
| 2003/0007005 A1* | 1/2003 | Kandogan | G06F 8/34 |
| | | | 715/763 |
| 2003/0135533 A1* | 7/2003 | Cook | G06F 8/34 |
| | | | 718/1 |
| 2007/0150864 A1* | 6/2007 | Goh | G06F 3/04817 |
| | | | 717/113 |
| 2007/0238520 A1 | 10/2007 | Kacmarcik | |
| 2007/0244847 A1 | 10/2007 | Au | |
| 2008/0092111 A1* | 4/2008 | Kinnucan | G06F 8/10 |
| | | | 717/105 |
| 2012/0259762 A1* | 10/2012 | Tarighat | G06F 8/34 |
| | | | 705/37 |
| 2014/0072115 A1* | 3/2014 | Makagon | H04M 3/5183 |
| | | | 379/265.09 |
| 2014/0129961 A1* | 5/2014 | Zubarev | G06Q 10/107 |
| | | | 715/752 |
| 2014/0287397 A1* | 9/2014 | Chong | G09B 5/12 |
| | | | 434/350 |
| 2015/0077325 A1* | 3/2015 | Ferens | G06F 3/011 |
| | | | 345/156 |
| 2015/0095882 A1* | 4/2015 | Jaeger | G06F 8/34 |
| | | | 717/109 |
| 2015/0130716 A1 | 5/2015 | Sridharan et al. | |
| 2015/0149912 A1* | 5/2015 | Moore | H04L 41/22 |
| | | | 715/736 |
| 2016/0026253 A1 | 1/2016 | Bradski et al. | |
| 2016/0269508 A1 | 9/2016 | Sharma et al. | |
| 2016/0342318 A1* | 11/2016 | Melchner | G06F 3/0486 |
| 2017/0052767 A1* | 2/2017 | Bennett | G06F 8/34 |
| 2017/0085445 A1* | 3/2017 | Layman | G06F 8/34 |
| 2017/0147296 A1* | 5/2017 | Kumar | G06Q 10/06 |
| 2017/0161123 A1* | 6/2017 | Zhao | G06F 11/302 |
| 2017/0255375 A1* | 9/2017 | Kim | G06F 30/00 |
| 2017/0255450 A1* | 9/2017 | Mullins | G06T 19/00 |
| 2017/0277516 A1* | 9/2017 | Grebnov | G06F 9/5038 |
| 2017/0315789 A1* | 11/2017 | Lam | G06Q 10/0633 |
| 2017/0316355 A1* | 11/2017 | Shrestha | G06Q 10/067 |
| 2017/0316363 A1* | 11/2017 | Siciliano | G06Q 10/06316 |
| 2018/0095542 A1 | 4/2018 | Mallinson | |
| 2018/0107461 A1* | 4/2018 | Balasubramanian | G06F 8/38 |
| 2018/0213048 A1* | 7/2018 | Messner | H04L 63/08 |
| 2018/0285084 A1* | 10/2018 | Mimlitch, III | G06F 11/3604 |
| 2018/0285476 A1* | 10/2018 | Siciliano | G06F 16/90 |
| 2019/0005228 A1* | 1/2019 | Singh | G06F 9/45558 |
| 2019/0065026 A1 | 2/2019 | Kiemele et al. | |
| 2019/0086997 A1* | 3/2019 | Kang | G06F 3/011 |
| 2019/0220863 A1* | 7/2019 | Novick | G06Q 20/10 |
| 2020/0301678 A1* | 9/2020 | Burman | G06F 9/541 |
| 2020/0356350 A1* | 11/2020 | Penland | G06F 8/34 |
| 2021/0152966 A1 | 5/2021 | Mathur | |
| 2022/0101040 A1* | 3/2022 | Zhang | G06V 10/82 |

OTHER PUBLICATIONS

Apaza-Yllachura et al., "SimpleAR: Augmented Reality high-level content design framework using visual programming", https://ieeexplore.ieee.org/document/8966427, IEEE, Apr. 9, 2019 (Year: 2019).*

Grzyb et al., "Beyond Robotic Speech: Mutual Benefits to Cognitive Psychology and Artificial Intelligence From the Study of Multimodal Communication", PsyArXiv Preprints, Available online at: <https://psyarxiv.com/h5dxy/>, Feb. 4, 2020, 24 pages.

Hou et al., "Visual Feedback Design and Research of Handheld Mobile Voice Assistant Interface", Atlantis Press, Advances in Intelligent Systems Research, vol. 146, Available online at: <https://download.atlantis-press.com/article/25894195.pdf>, 2018, pp. 174-178.

Ravenet et al., "Automating the Production of Communicative Gestures in Embodied Characters", Frontiers in Psychology, vol. 9, Article 1144, Available online at: <https://www.ncbi.nlm.nih.gov/pmc/articles/PMC6046454/>, Jul. 9, 2018, pp. 1-12.

* cited by examiner

DEVICES AND METHODS FOR VISUAL PROGRAMMING

CROSS-REFERENCE TO RELATED APPLICATIONS

This application claims the benefit of U.S. Provisional Application No. 63/052,418, filed Jul. 15, 2020, the content of which is incorporated herein by reference in its entirety for all purposes.

FIELD OF THE DISCLOSURE

This relates generally to devices, methods, and graphical user interfaces for computer programming.

BACKGROUND OF THE DISCLOSURE

Computer-generated environments are environments where at least some objects displayed for a user's viewing are generated using a computer. A user may interact with objects displayed in a computer-generated environment using input devices (e.g., a mouse, a touch sensor, etc.). However, programming the behaviors of objects in a computer-generated environment can be complex and time consuming.

SUMMARY OF THE DISCLOSURE

Some embodiments described in this disclosure are directed to devices, methods, and graphical user interfaces for visual programming in a computer-generated environment. Some embodiments described in this disclosure are directed to displaying a graphical representation of a programming structure in a computer-generated environment and/or interactions with the graphical representation of the programming structure to define behavior of an object in a computer-generated environment. In some embodiments, the behavior of the object is defined by a trigger and an action. In some embodiments, the interactions include adding one or more graphical representations of programming objects (e.g., triggers, actions, conditional logic, pointers to object, etc.) to the graphical representation of the programming structure, removing one or more graphical representations of programming objects from the graphical representation of the programming structure and/or from the computer-generated environment, and/or previewing/debugging the behavior defined by the graphical representation of the programming structure. Representing programming with graphical representations of programming structures and programming objects can provide an intuitive, transparent, and efficient user experience for programming over text-based programming or node-graph based programming. It is understood that this Summary does not limit the scope of the disclosure in any way. Additional descriptions of the embodiments of this disclosure are provided in the Drawings and the Detailed Description that follow.

DETAILED DESCRIPTION

Figure 1:
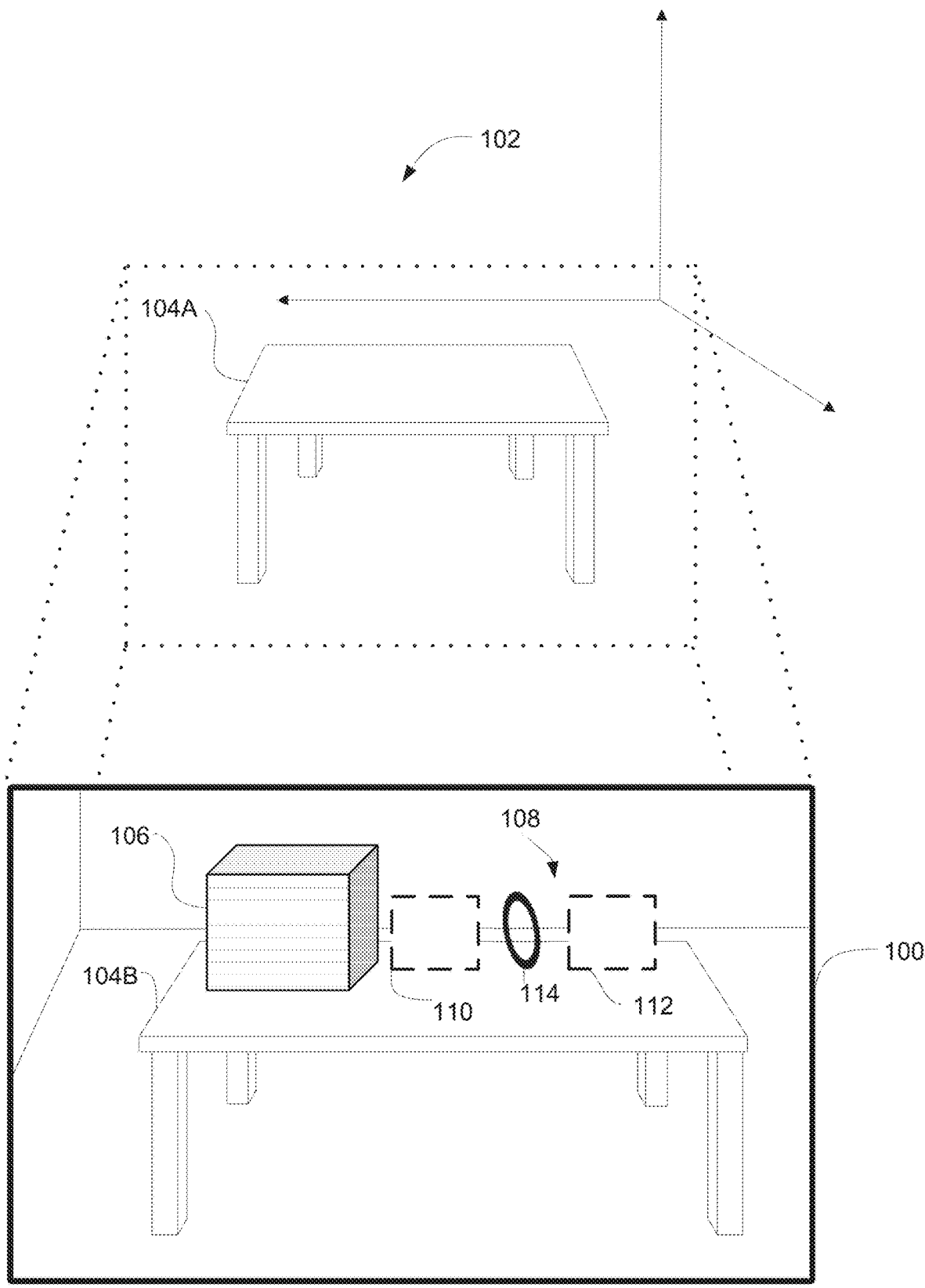
FIG. 1 illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first programming object (or first user interface element) could be termed a second programming object (or second user interface element), and, similarly, a second programming object (or second user interface element) could be termed a first programming object (or first user interface element), without departing from the scope of the various described embodiments. The first programming object (or user interface element) and the second programming object (or user interface element) are both programming objects (or user interface elements), but they are not the same programming object or user interface element.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As described herein, the term "if", optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. An XR environment is often referred to herein as a computer-generated environment. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 illustrates an electronic device 100 according to some embodiments of the disclosure. In some embodiments, electronic device 100 is a portable electronic device, such as a tablet computer, laptop computer, a smartphone, or another device including a display generation component. Example architectures of electronic device 100 are described below with reference to the block diagrams of FIGS. 2A-2B. FIG. 1 illustrates electronic device 100 and table 104 located in the physical environment 102. In some embodiments, electronic device 100 is configured to capture and/or display areas of physical environment 102 including table 104A (illustrated in the field of view of electronic device 100). In some embodiments, in response to a trigger, the electronic device 100 is configured to display an object 106 in the computer-generated environment that is not present in the physical environment 102, but is displayed in the computer generated environment positioned on or otherwise anchored to the top surface of a computer-generated representation 104B of real-world table 104A. In FIG. 1, for example, object 106 (e.g., a virtual object) is displayed on the surface of the table 104B in the computer-generated environment displayed via device 100 in response to detecting the planar surface of table 104A in the physical environment 102. It should be understood that although object 106 is represented as a cube in FIG. 1 that object 106 is a representative object and one or more different objects (e.g., of various dimensionality such as two-dimensional or three-dimensional objects) can be included and rendered in a two-dimensional or a three-dimensional computer-generated environment. For example, the object can represent an application, a user interface, or a representation of a real-world object displayed in the computer-generated environment. Additionally, it should be understood, that the three-dimensional (3D) environment (or 3D object) described herein may be a representation of a 3D environment (or 3D object) displayed in a two dimensional (2D) context (e.g., displayed on a 2D display screen).

In some embodiments, the electronic device 100 is configured to display another object 108 in the computer-generated environment that is not present in the physical environment 102, but is displayed in the computer generated environment (optionally positioned on or otherwise anchored to the top surface of a computer-generated representation 104B of real-world table 104A). Object 108 is optionally a graphical representation of a programming structure (of referred to herein as a "representation of a programming structure" or more simply as "a programming structure"). The programming structure, in some embodiments, optionally includes a first user interface element 110, a second user interface element 112, and a third user interface element 114. The first user interface element 110 is optionally a user interface element configured to accept a graphical representation of a programming object of a first type (e.g., a trigger). The second user interface element 112 is optionally a user interface element configured to accept a graphical representation of a programming object of a second type (e.g., an action). The third user interface element 114 is optionally a user interface element linking the first user interface element 110 and the second user interface element 112. Thus, the programming structure can be viewed as defining behavior of an object in an enhanced reality computer-generated environment. This programming structure, displayed in an enhanced reality environment (optionally concurrently with the object that is the subject of the programming structure), provides improved context for a user over other means of programming (e.g., such as node graphs).

In some embodiments, user input can be used to interact with the programming structure, including an enhanced reality user input. For example, the enhanced reality user input can include input based on gaze (e.g., captured by eye-tracking sensor(s)) and/or hands/fingers (e.g., captured by hand-tracking sensor(s)) interacting with real-world and/or virtual objects in the enhanced reality environment. In some embodiments, the user inputs can include inputs to move the programming structure within the enhanced reality environment. For example, in some embodiments, the first user interface element 110 and the second user interface element 112 are anchored to the third user interface element 114, such that movement of the third user interface element (e.g., in response to an input) causes movement of first and second user interface elements 110, 112. In some embodiments, the user inputs can include inputs to add programming object(s) to the programming structure. In some embodiments, as described herein, the programming structure is displayed in the computer-generated environment and the first user interface element 110 and the second user interface element 112 are representations of empty user interface containers configured to accept graphical representations of programming objects. In some embodiments, user inputs can add programming objects displayed in the computer-generated environment to the programming structure displayed in the computer-generated environment. In response to adding programming object(s) to the programming structure, in some embodiments, the first user interface element 110 and/or the second user interface element 112 include graphical representation(s) of the added programming object(s) (e.g., graphical representations of programming objects fill and/or replace the user interface container). In some embodiments, user inputs can modify the programming structure (e.g., replacing programming object(s) and/or deleting programing object(s)) and/or delete programming object(s) and/or programming structure(s) displayed in the computer-generated environment, among other possible interactions.

Figure 2A:
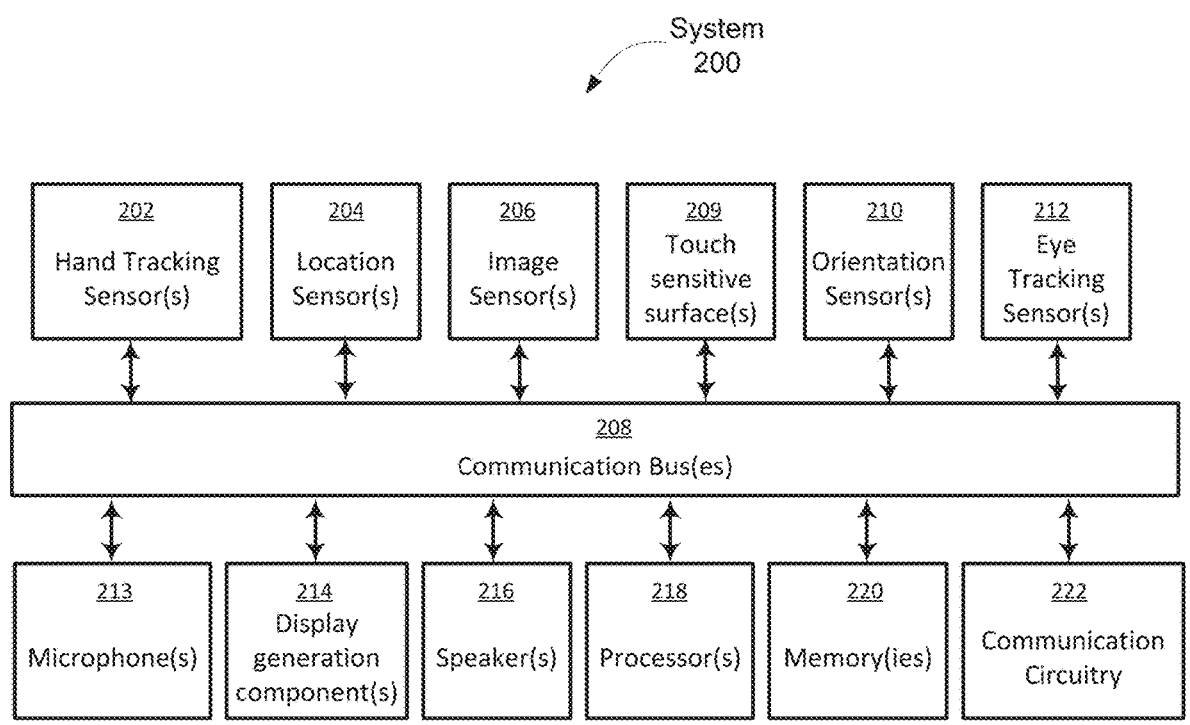
FIGS. 2A-2B illustrate example block diagrams of architectures for a system or device in accordance with some embodiments of the disclosure.
Figure 2B:
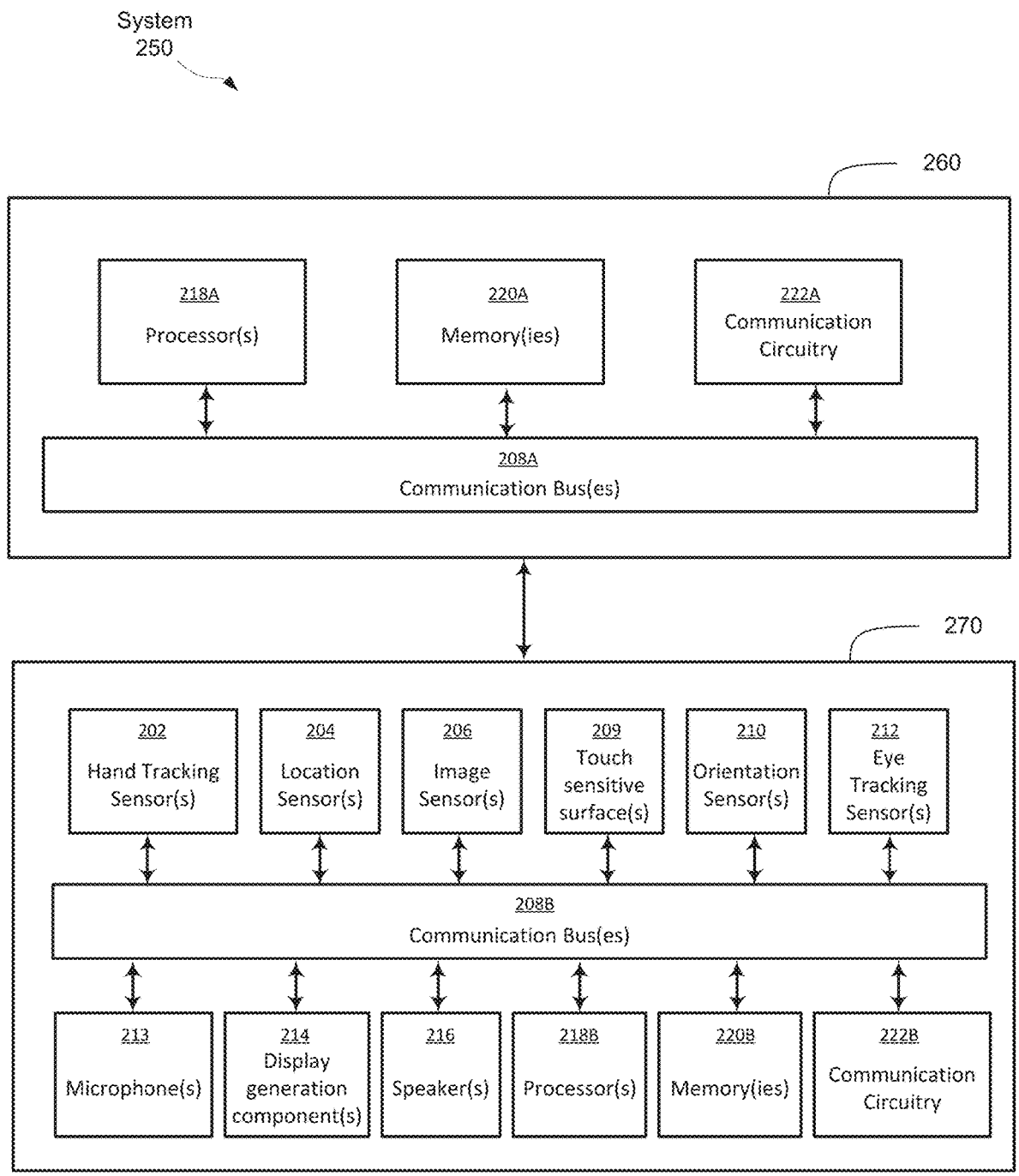

FIGS. 2A-2B illustrate example block diagrams of architectures for a system or device in accordance with some embodiments of the disclosure. In some embodiments, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some embodiments, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some embodiments, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some embodiments, display generation component(s) 214 include multiple displays. In some embodiments, display generation component(s) 214 includes a display with a touch-sensitive surface (e.g., a touch screen), a projector, a holographic projector, a retinal projector, etc.

In some embodiments, device 200 includes touch-sensitive surface(s) 209 configured to receive user inputs (touch and/or proximity inputs), such as tap inputs and swipe inputs or other gestures. In some embodiments, display generation component(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 206 include a first image sensor and a second image sensor. The first image sensor and the second image sensor work together and are optionally configured to capture different information of physical objects in the real-world environment. In some embodiments, the first image sensor is a visible light image sensor and the second image sensor is a depth sensor. In some embodiments, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some embodiments, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, and/or head, more generally) with respect to the real-world or computer-generated environment and/or relative to the display generation component(s) 214. In some embodiments, hand tracking sensor(s) 202 and/or eye tracking sensor(s) 212 are implemented together with the display generation component(s) 214 (e.g., in the same device). In some embodiments, the hand tracking sensor(s) 202 and/or eye tracking sensor(s) 212 are implemented separate from the display generation component(s) 214 (e.g., in a different device).

In some embodiments, the hand tracking sensor(s) 202 uses image sensor(s) 206 (e.g., one or more IR cameras, 3D cameras, depth cameras, etc.) that capture three-dimensional information from the real-world including one or more hands. In some embodiments, the hands can be resolved with sufficient resolution to distinguish fingers and their respective positions. In some embodiments, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, eye tracking sensor(s) 212 includes one or more eye tracking cameras (e.g., IR cameras) and/or illumination sources (e.g., IR light sources/ LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and a gaze can be determined from tracking both eyes. In some embodiments, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some embodiments, microphone(s) 213 includes an array of microphones that optionally operate together (e.g., to identify ambient noise or to locate the source of sound in space of the real-world environment).

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some embodiments, as illustrated in FIG. 2B, system/device 250 can be divided between multiple devices. For example, a first device 260 optionally includes processor(s) 218A, memory or memories 220A, and communication circuitry 222A, optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

A computer-generated environment may be displayed using an electronic device (e.g., electronic device 100, device 200, device 250), including using one or more display generation components. The computer-generated environment can optionally include various graphics user interfaces ("GUIs") and/or user interface elements/objects. As described herein, in some embodiments, a graphical representation of programming structure is displayed to the user in the computer-generated environment to define behavior of an object displayed (or to be displayed) in the computer-generated environment. In some embodiments, user input is provided to add, modify and/or delete programming objects to/from the programming structure to define the behavior of the object. Using a graphical representation of a programming structure can provide for an efficient and intuitive user experience. For example, behavior can be assigned to objects in a computer-generated environment using simple manipulations of graphical representations of programming objects, such as triggers, actions, and objects, to define behavior without having to program the underlying behavior with lower level program code and/or accounting for the syntax and structure of the program code. As an example, adding a graphical representation of an action (e.g., expanding an object to show an exploded view of the components of the object) and a graphical representation of a trigger (e.g., selecting the object, such as with a tap gesture) to a graphical representation of a programming structure associated with the object can define the behavior for the object. The underlying program code of the trigger and/or action (e.g., a function to select an object in response to a tap input and/or a function to show an exploded view of an object) can be invoked by the graphical representation of the programming structure without the user having to write the underlying program code of the trigger and/or action which may be separately defined (e.g., in a library). Thus, the graphical representation of the programming structure provides users the ability to efficiently program behaviors of objects in a computer-generated environment in a simplified manner using predefined triggers and/or action.

Figure 3:
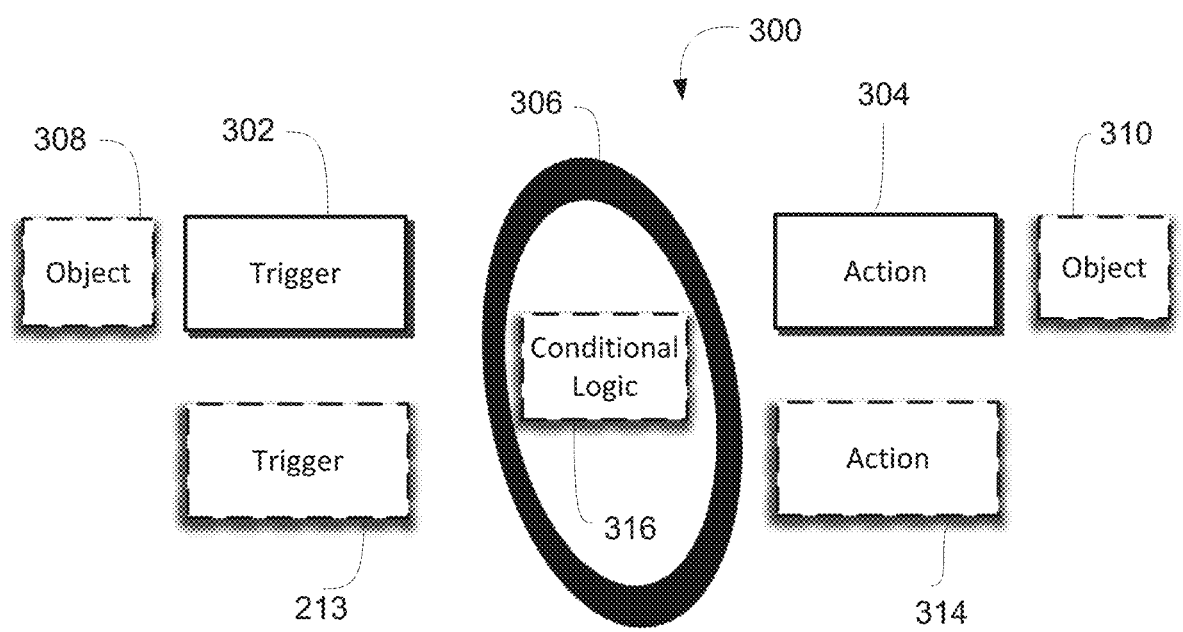
FIG. 3 illustrates an example programming structure according to some embodiments of the disclosure.

FIG. 3 illustrates an example programming structure according to some embodiments of the disclosure. In some embodiments, programming structure 300 includes a first user interface element 302, a second user interface element 304, and a third user interface element 306 (e.g., corresponding to user interface elements 110, 112 and 114, respectively, of FIG. 1). Exemplary first user interface element 302 is a user interface element, such as a container, configured to accept a graphical representation of a programming object of a first type (e.g., a trigger). In some embodiments, first user interface element 302 is a two-dimensional container (e.g., a rectangle or other shaped container) or a three-dimensional container (e.g., a box or other shaped container) configured to accept two-dimensional and/or three-dimensional representations of programming objects (e.g., 2D or 3D blocks). In some embodiments, exemplary second user interface element 304 is a user interface element configured to accept a graphical representation of a programming object of a second type (e.g., an action). In some embodiments, second user interface element 304 is a two-dimensional container (e.g., a rectangle or other shaped container) or a three-dimensional container (e.g., a box or other shaped container) configured to accept two-dimensional and/or three-dimensional representations of programming objects (e.g., 2D or 3D blocks). In some embodiments, the representation of the first and second user interface elements (and their corresponding programming objects) have different appearances (e.g., different sizes, shapes, colors, etc.) to provide a visual indication to the user about a correspondence between different types of programming objects intended for different types of user interface elements in the programming structure (e.g., to avoid syntax mistakes such as inserting an action type programming object into a user interface element configured to accept a trigger type programming object).

In some embodiments, exemplary third user interface element 306 is a user interface element linking the first user interface element 302 and the second user interface element 304 (e.g., the first user interface element 302 and the second user interface element 304 are optionally anchored to the third user interface element 114). For example, the third (linking) user interface element visually represents a relationship between a trigger and an action defining the behavior of the programming structure. In some embodiments, the third user interface element 306 is a 2D or 3D representation. For example, FIG. 3 illustrates a 3D ring (e.g., a cross-section of a hollow cylinder), though other representations are possible (e.g., a line, rectangle, etc.). FIG. 3 illustrates the 3D ring with an angled perspective to illustrate one possible shape, though it is understood that the orientation may be a different angle (e.g., the ring may appear similar to a line or planar shape when viewed head-on).

In some embodiments, programing structure 300 includes components that are optional. In some embodiments, trigger corresponding to the first user interface element 302 is optional. Consider, for instance, a use case in which a light bulb object is to turn on or off based on a time of day condition. In some embodiments, conditional logic corresponding to the user interface element 316 is optional. Consider, for instance, a use case in which a light bulb object is to turn on or off based on a trigger, such as a particular user input.

In some embodiments, the programming structure 300 is associated with an object. In some embodiments, a user input adding the programming structure 300 to the computer-generated environment is performed while an object is selected (or otherwise specifying an object). In some such embodiments, an associated action added to the programming structure defaults to the associated object (e.g., performing the action with respect to the object, assuming that the type of action is object-related). In some embodiments, an associated trigger added to the programming structure also defaults to the associated object (e.g., linking the trigger to the object, assuming that the type of trigger is object-related). For example, a graphical representation of a "tap" trigger (e.g., a trigger that causes an action to be performed when a tap input is received) optionally defaults to a trigger that requires tapping the object associated with the programming structure. However, a graphical representation of an "ambient light" trigger (e.g., a trigger that causes an action to be performed when the ambient light is above or below a threshold) may default to the ambient light measured in real-world or virtual light sources rather than defaulting to the associated object. Likewise, a graphical representation of an "exploded view" action (e.g., an action that results in an exploded view being presented when a trigger is received) optionally defaults to presenting an exploded view the object associated with the programming structure. However, a graphical representation of an "audio feedback" action (e.g., an action that results in playback of a sound when the trigger is received) may default to playing a specific sound rather than defaulting to the associated object.

In some embodiments, user input associates (or changes an association of) a programming object in the programming structure 300 with an object. In some embodiments, programming structure 300 optionally includes a user interface element 308 configured to receive a graphical representation of an object (e.g., optionally a pointer to the object) and indicating an object associated with a trigger (e.g., in first user interface element 302) and/or a user interface element 310 configured to receive a graphical representation of an object and indicating an object associated with an action (e.g., in second user interface element 304). In some embodiments, rather than having separate user interface elements 308, 310, a representation of the object (e.g., a pointer to the object) is added directly into a graphical representation of a programming object (e.g., an action or a trigger) in the first user interface element 302 and/or in the second user interface element 304. As an example, a pointer to a computer-generated representation 104B of real-world table 104A can be added to a "tap" trigger, and a pointer to object 106 can be added to an "exploded view" action, such that a tapping input on the representation 104B of the table can trigger an exploded view of object 106.

In some embodiments, a relationship between a trigger and an action defaults to performing the action in response to the trigger. In some embodiments, additional conditional logic between a trigger and an action can define a relationship with further conditions between performing the action (e.g., performing the action in response to the trigger when one or more additional conditions are satisfied). In some embodiments, a user interface element 316 is optionally included in programming structure 300 configured to accept a graphical representation of a programming object of a third type (e.g., conditional logic). User interface element 316 optionally define additional conditions on the relationship between the trigger and the action (e.g., beyond a default relationship).

In some embodiments, programming structure 300 optionally includes multiple triggers and/or multiple actions (each optionally associated with one or more objects). FIG. 3 illustrates an optional additional user interface element 312 configured to accept a graphical representation of a programming object of a first type (e.g., a trigger) and/or an optional additional user interface element 314 configured to accept a graphical representation of a programming object of a second type (e.g., an action). User interface element 316 optionally represents multiple user interface elements 316 configured to accept graphical representations of programming objects of a third type (e.g., conditional logic) between one or more respective trigger(s) and one or more respective action(s).

In some embodiments, a programming structure may include one respective action and multiple triggers for the respective action. In some such embodiments, the respective action is performed in response to any of the multiple triggers (e.g., without the need for additional conditional logic). In some such embodiments, first conditional logic is optionally included between a first trigger and the respective action, and second conditional logic (e.g., different than the first conditional logic) is optionally included between a second trigger and the respective action. It is understood that the multiple triggers may include more than two triggers and conditional logic can be added between some or all of the triggers and a respective action.

In some embodiments, a programming structure may include one respective trigger and multiple actions in response to the respective trigger. In some such embodiments, the respective trigger causes any of the multiple actions to be performed (e.g., without the need for additional conditional logic). In some such embodiments, first conditional logic is optionally included between the respective trigger and a first action, and second conditional logic (e.g., different than the first conditional logic) is optionally included between the respective trigger and a second action. It is understood that the multiple actions may include more than two actions and conditional logic can be added between some or all of the actions and a respective trigger.

In some embodiments, a programming structure may include multiple triggers and/or multiple actions, optionally including conditional logic defining relationships between some or all of the trigger(s) and action(s). In some embodiments, a programming structure is be limited to multiple triggers for one corresponding action or multiple actions corresponding to one trigger to reduce the complexity of the programming structure.

Figure 4:
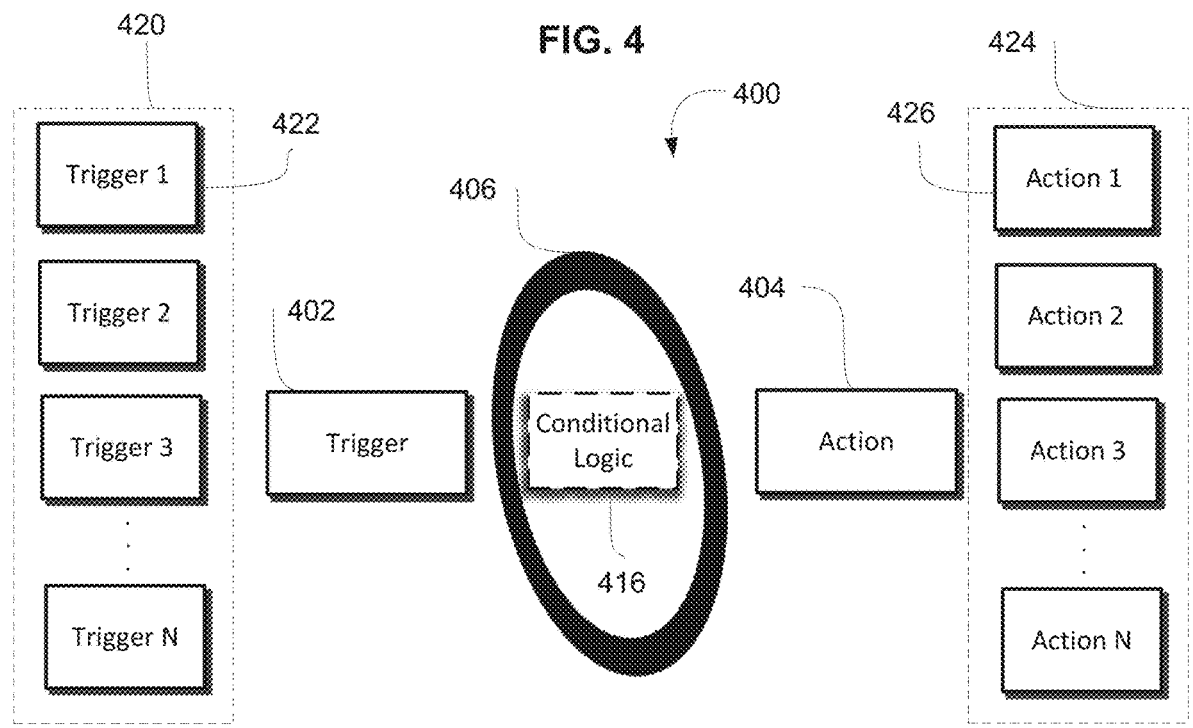
FIG. 4 illustrates an example programming structure and graphical representations of programming objects according to some embodiments of the disclosure.

As described herein, in some embodiments, a user may add graphical representations of programming objects to the programming structure. FIG. 4 illustrates an example programming structure and graphical representations of programming objects according to some embodiments of the disclosure. FIG. 4 illustrates a computer-generated environment including a programming structure 400 optionally including a first user interface element 402, a second user interface element 404, a third user interface element 406, and a fourth user interface element 416 (e.g., corresponding to programming structure 300 and user interface elements 302, 304, 306, and 316, respectively, of FIG. 3). In some embodiments, as illustrated in FIG. 4, the computer-generated environment also displays graphical representations of programming objects such as trigger(s) corresponding to user interface element(s) 422 and action(s) corresponding to user interface element(s) 426. In some embodiments, the graphical representations of programming objects are displayed floating in the computer-generated environment. In some embodiments, the graphical representations of programming objects are displayed in a user interface element (e.g., a container, window, menu, pane, etc.) in the computer-generated environment. For example, FIG. 4 illustrates graphical representations of programming objects of a first type (e.g., triggers) optionally displayed in a first user interface element 420 and graphical representations of programming objects of a second type (e.g., actions) optionally displayed in a second user interface element 424. In some embodiments, the graphical representations of programming objects are displayed in one common user interface element. In some embodiments, the first user interface element 420 and/or the second user interface element 424 are optionally displayed in proximity to programming structure 400 (optionally in response to a trigger) to reduce the amount of input movement required to add a programming object to the programming structure.

Although not shown in FIG. 4, in some embodiments, the programming structure include additional user interface elements configured to accept additional programming objects (e.g., as illustrated in FIG. 3). In some such embodiments, the graphical representations of programming objects displayed in the computer-generated environment optionally include programming objects of other types (e.g., conditional logic, and/or objects, among other possibilities).

In some embodiments, adding a graphical representation of programming object to the programming structure is achieved using a user input. In some embodiments, the user input is a "drag-and-drop" action/operation (also referred to herein as a "click-and-drag" action/operation) in which a user input selects a graphical representation of a programming object (e.g., from a user interface element 420, 424), moves the graphical representation of the programming object to the programming structure, and deselects (or releases) the graphical representation of the programming object. In some embodiments, selecting includes a gesture made by a hand or a representation of the hand (e.g., a pinching or touching of two fingers of a hand), the movement includes movement of the hand or the representation of the hand, and/or the deselection includes a gesture made by the hand or the representation of the hand (e.g., releasing the pinching/contact of the two fingers of the hand or the representation of the hand).

In some embodiments, the selection includes pinching the representation of the programming object in the enhanced reality computer-generated environment with the hand or a representation of the hand displayed in the enhanced reality computer-generated environment (e.g., with contact between the hand/representation of the hand and the representation of the programming object). In some embodiments, the movement includes movement of the hand or the representation of the hand, which causes movement of the representation of the programming object in the computer-generated environment in accordance with the movement. In some embodiments, the amount of movement of the representation of the programming object is the same as the amount of movement of the hand/representation of the hand. In some embodiments, the amount of movement of the representation of the programming object is a scaled amount of the movement of the hand/representation of the hand. In some embodiments, the scaling is linear or non-linear, optionally dependent on the speed of the movement (e.g., with speed correlated with more scaling). In some embodiments, the deselection includes releasing the representation of the programming object in the enhanced reality computer-generated environment from the hand or a representation of the hand displayed in the enhanced reality computer-generated environment (e.g., contact between the hand/representation of the hand and the representation of the programming object is broken) and the representation of the programming object is placed in the computer-generated environment at its position at the time of deselection/release.

In some embodiments, gaze is used as part of the drag-and-drop operation. In some such embodiments, the selection includes the gesture by the hand/representation of the hand at a distance from the representation of the programming object in the enhanced reality computer-generated environment. Gaze directed at a respective representation of the programming object is optionally used to select the respective representation of the programming object in response to the gesture. In some embodiments, the movement of the input includes movement of the gaze into the programming structure (e.g., to a specific user interface element in the programming structure configured to receive the representation of the programming object. In some embodiments, the deselection includes releasing the gesture, and the representation of the programming object is placed in the computer-generated environment at the position in the computer-generated environment indicated by the gaze at the time of deselection/release. In some embodiments, gaze is used in conjunction some or all of the selection, the movement and/or the deselection by the hand/representation of the hand (e.g., to indicate which of the representations of the programming objects is targeted by the hand/representation of the hand, to indicate a targeted position to place the representations of the programming objects upon release, etc.)

In some embodiments, the selection optionally further includes movement in a predetermined direction. For example, the selection may include the hand pinching and pulling toward the user (and optionally further including gaze) to select the programming object.

In some embodiments, to improve the user experience (e.g., making the process of adding representations of the programming objects to the programming structure more efficient and intuitive), representations of the programming objects may snap to user interface elements configured to receive the representations of the programming objects. In some such embodiments, in accordance with a determination that one or more snapping criteria are satisfied the representation of the programming object snaps to the corresponding user interface element in the programming structure (e.g., the representation of the programming object is displayed occupying the corresponding user interface element in the programming structure, which may be different than the position of the representation of the programming object at the time of release). In some embodiments, in accordance with a determination that the one or more snapping criteria are not satisfied, the representation of the programming object does not snap to the corresponding user interface element in the programming structure. Instead, the representation of the programming object either returns back to its original position at the start of the input or it is placed in the computer-generated environment at its position upon release without being added to the programming structure.

Figure 5:
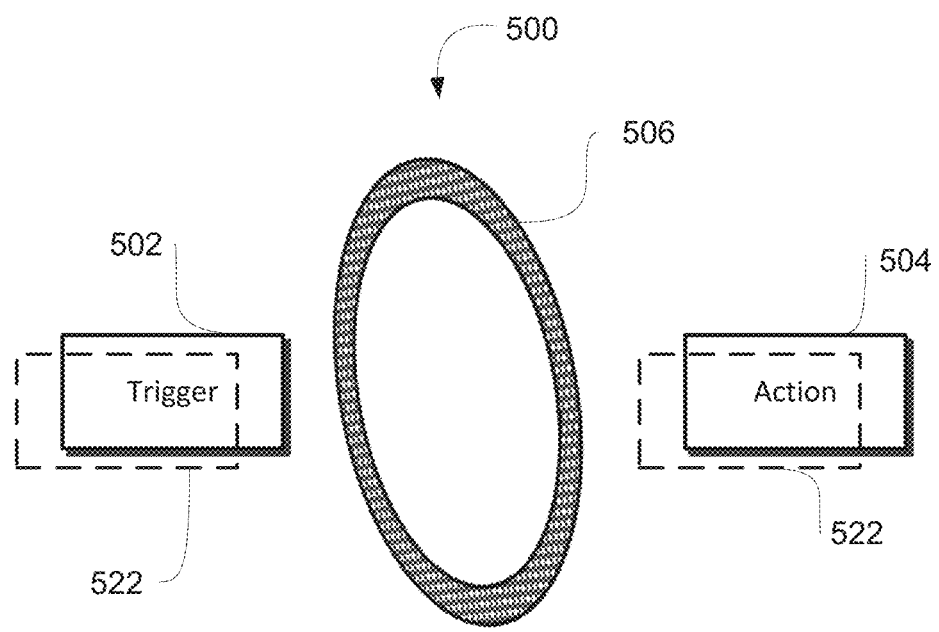
FIG. 5 illustrates an example programming structure and snapping graphical representations of programming objects according to some embodiments of the disclosure.

FIG. 5 illustrates an example programming structure and snapping graphical representations of programming objects according to some embodiments of the disclosure. FIG. 5 illustrates a computer-generated environment including a programming structure 500 optionally including a first user interface element 502, a second user interface element 504, and a third user interface element 506 (e.g., corresponding to programming structures 300, 400 and user interface elements 302/402, 304/404, and 306/406, respectively, of FIGS. 3-4). FIG. 5 also illustrates a representation of the programming object 522 in proximity to user interface element 502 and/or a representation of the programming object 522 in proximity to user interface element 504 in the computer-generated environment. For example, the representation of the programming object 522 corresponds to the programming object during the input to add the representation of the programming object to the programming structure (e.g., prior to deselecting/releasing the input).

As illustrated in FIG. 5, the representation of the programming object 522 and the user interface element 502/504 are not aligned within the computer-generated environment. In some embodiments, the one or more snapping criteria include a position criterion that is satisfied when the representation of the programming object is within a threshold distance of the user interface element configured to accept the representation of the programming object upon release. The position criterion is not satisfied when the representation of the programming object is outside the threshold distance. In some embodiments, the threshold distance is three dimensional distance between the representation of the programming object and the representation of the corresponding user interface element. In some embodiments, the threshold distance requires proximity in fewer dimensions (e.g., within a threshold distance in one dimension or two dimensions. In some embodiments, the position criterion requires that the representation of the programming object overlaps, at least partially, the user interface element configured to accept the representation of the programming object (e.g., as viewed from the perspective of the user).

In some embodiments, the one or more snapping criteria include a programming object type criterion that is satisfied when the representation of the programming object is of a type that matches the type of programming object that the user interface element is configured to accept. The position criterion is not satisfied when the representation of the programming object is of a type that does not match the type of programming object that the user interface element is configured to accept. For example, programming object 522 of a first type (e.g., a trigger) may snap to user interface element 502 configured to accept a representation of the programming object of the first type (e.g., a trigger) when the user deselects the representation of the programming object 522 in proximity to user interface element 502. However, programming object 522 of a first type (e.g., a trigger) may not snap to user interface element 504 configured to accept a representation of the programming object of the second type (e.g., an action) when the user deselects the representation of the programming object 522 in proximity to user interface element 504.

Additionally or alternatively, in some embodiments, to improve the user experience (e.g., making the process of adding representations of the programming objects to the programming structure more efficient and intuitive), an appearance of representations of the programming objects and/or the programming structure may change or may be enhanced to provide feedback during the process of adding representations of the programming objects to the programming structure. In some embodiments, when the one or more snapping criteria are satisfied (and prior to deselecting/releasing) the appearance of third user interface element 506 (e.g., as presented by the display generation component) is optionally enhanced or otherwise changed to indicate that deselecting/releasing will add the representation of the programming object to the programming structure. For example, FIG. 5 illustrates third user interface element 506 with a different appearance (different shading) as compared with third user interface elements 306 or 406. Enhancing or otherwise changing the appearance of the third user interface element optionally includes changing the size, shape and/or color of the third user interface element, among other possibilities. In some embodiments, enhancing or otherwise changing the appearance of the third user interface element optionally includes a different lighting effect, shadow effect, halo effect, etc. to the third user interface element.

Additionally or alternatively, in some embodiments, the appearance of the representation of the programming object and/or the representation of the corresponding user interface object in proximity to the representation of the programming object is changed or enhanced.

In some embodiments, the appearance may be changed/enhanced when at least a subset of the one or more snapping criteria are satisfied. For example, the appearance may be changed/enhanced when the representation of the programming object satisfies the position criterion. In some such embodiments, the appearance of the representation of the programming object, user interface element in proximity to the representation of the programming object and/or the third user interface element may be changed/enhanced. In some such embodiments, the change/enhancement of the appearance may be a first change/enhancement in accordance with satisfying the programming object type criterion, and may be a second change/enhancement in accordance with failing to satisfy the programming object type criterion. For example, user interface element 502 may change to a first color (e.g., green) when the representation of the programming object 522 of the matching type is in proximity to user interface element 502, and user interface element 504 may change to a second, different color (e.g., red) when the representation of the programming object 522 of mismatched type is in proximity to user interface element 504. As such, an indication of proximity is provided to the user by a change/enhancement of appearance (e.g., satisfaction of the position criterion), and an additional indication is provided to the user about whether the representation of the programming object matches its target user interface element in the programming structure (e.g., satisfaction of the programming object type criterion).

Although the user interface elements of a programming structure are primarily described herein as configured to accept a trigger or an action, the type of programming object acceptable to the user interface elements may be undefined when the first and second user interface elements are empty to provide additional flexibility to the user. In some embodiments, adding a first programming object to the first or second user interface elements assigns a type for the user interface element to which the first programming object is added, and the user interface element on the opposite side of the programming structure (e.g., opposite side of the third user interface element) is assigned the opposite type. In some embodiments, deleting programming object(s) to empty the programming structure clears this assignment.

Figure 6:
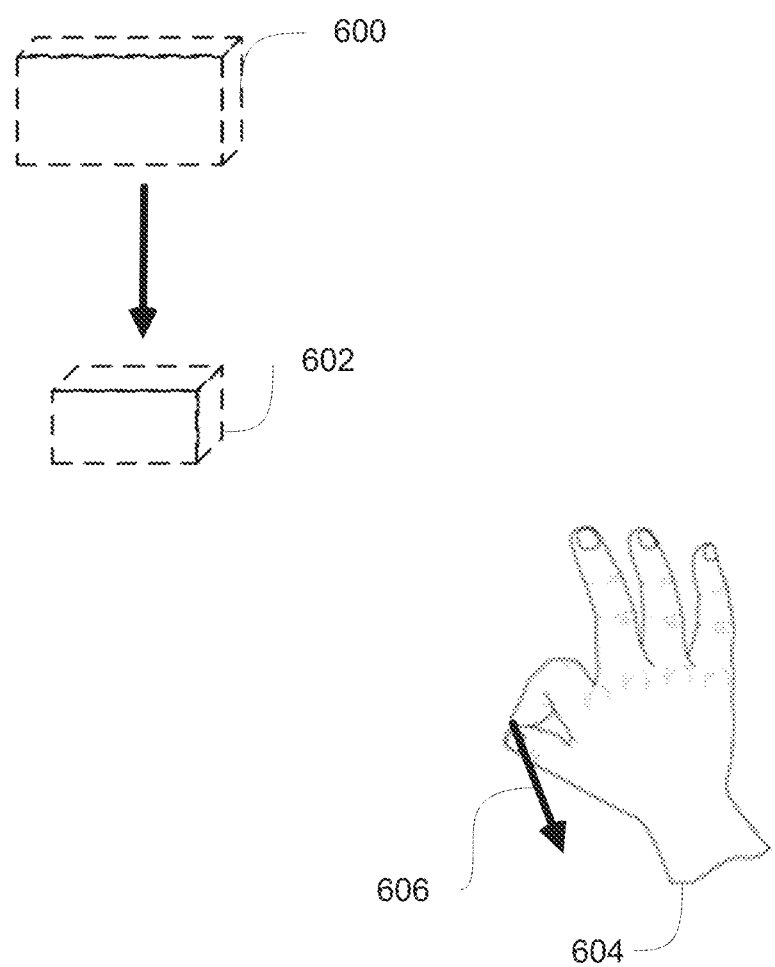
FIG. 6 illustrates an example of extracting a pointer from an object according to some embodiments of the disclosure.

In some embodiments, objects (e.g., virtual objects) may be added as programming objects to user interface elements of the programming structure configured to accept object-type programming objects. In some embodiments, a pointer to an object may be extracted in the computer-generated environment (without moving the object in the computer-generated environment) and the pointer to the object can be added to the programming structure to associate the programming structure (or a trigger and/or action of the programming structure) with the object via the pointer. FIG. 6 illustrates an example of extracting a pointer from an object according to some embodiments of the disclosure. FIG. 6 illustrates an object 600 (real-world or virtual) presented in a computer-generated environment. In some embodiments, a pointer 602 is extracted from object 600 (represented by the arrow in FIG. 6 between object 600 and pointer 602) in response to an input. In some embodiments, the input to extract pointer 602 comprises a selection (e.g., a pinch using hand 604 or a representation of hand 604 while gaze is focused on object 600) and movement in a predetermined direction by a threshold amount (e.g., toward the user as illustrated by arrow 606). In some embodiments, the extracted pointer is optionally added to the programming structure by further movement input, such as by moving the representation of pointer 602 to a user interface element of the programming structure, and deselection (e.g., releasing the pinch) in a similar manner as described above with respect to adding programming objects in FIG. 4.

In some embodiments, when the pointer to an object is added to the programming structure, the appropriate characteristics of the programing object to which the object is associated is applied without further user input (without requiring the user to keep track of the properties/characteristic of the object and assign the properties/characteristics explicitly via additional programming inputs). For example, if the object includes multiple input devices and multiple output devices, the pointer to the object may automatically cause selection of the correct input/output device in accordance with the trigger/action. For example, the same pointer to an object can be associated with a trigger and/or an action, but the programming language applies the trigger to an input device of the object and applies the action to an output device of the object, for example, without the user specifying the input device/output device. Thus, the use of pointers and the ability of the electronic device to intelligently use the pointer in accordance with the context of the programming object to which it is associated can simplify the programming process to assign behaviors to objects.

In some embodiments, a programming structure (e.g., including a trigger and an action) is associated with pointers to multiple objects, and the action applied to the multiple objects is determined based on the characteristics of each object. For example, a trigger (e.g., detecting motion above a threshold) can cause an action for two objects and the action for each object may depend on different characteristics of those objects (without requiring additional user input to specify the different characteristics).

Although pointers are primarily discussed in the context of objects in the enhanced reality computer-generated environment, it is understood that, in some embodiments, points are extracted from representations of other programming objects (e.g., actions/triggers in user interface elements 420, 422) for placement into the programming structure. Additionally or alternatively, in some embodiments, pointers to a programming object can be extracted from a programming structure and placed into another programming structure to easily duplicate programming objects across multiple programming structures displayed in the computer-generated environment.

Figure 7:
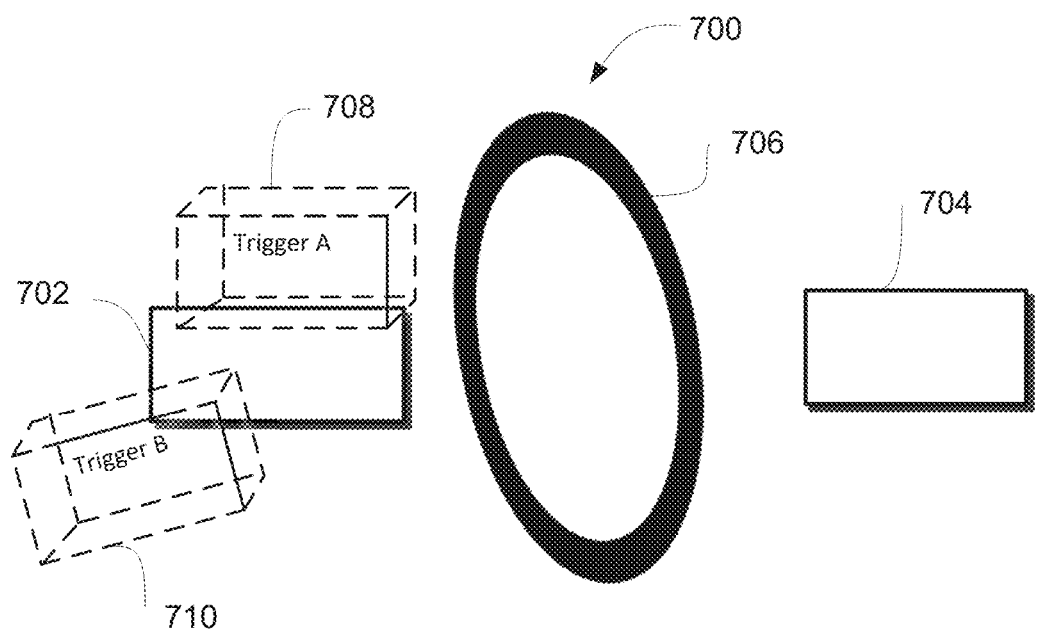
FIG. 7 illustrates an example of replacing a programming object according to some embodiments of the disclosure.

In some embodiments, programming objects in the programming structure may be replaced by other programming objects. In some embodiments, the programming objects are replaced by adding a new programming object in the manner described above with respect to FIG. 4. In some embodiments, replacing the programming objects in the programming structure is animated. FIG. 7 illustrates an example of replacing a programming object according to some embodiments of the disclosure. FIG. 7 illustrates a computer-generated environment including a programming structure 700 optionally including a first user interface element 702, a second user interface element 704, and a third user interface element 706 (e.g., corresponding to programming structures 300, 400, 500 and user interface elements 302/402/502, 304/404/504, and 306/406/506, respectively, of FIGS. 3-5). For example, FIG. 7 represents graphical representation of a programming object 708 ("Trigger A") being replaced by a graphical representation of a programming object 710 ("Trigger B"). In the example illustrated in FIG. 7, replacing the programming object in user interface element 702 is animated by graphical representation of a programming object 710 (represented as a box/block) pushing graphical representation of a programming object 708 out of user interface element 702 as graphical representation of a programming object 710 is added to user interface element 702.

In some embodiments, this animation previews the operation upon releasing/deselecting graphical representation of a programming object 710. For example, if the user were to move graphical representation of a programming object 710 away from user interface element 702 (e.g., ceasing to satisfy the snapping criteria) prior to releasing, the graphical representation of a programming object 708 would remain in user interface element 702 and graphical representation of a programming object 710 optionally remains in its place in the computer-generated environment at which it is released (or optionally disappears or returns to its original position prior to the input). Upon releasing the graphical representation of a programming object 706 at or in proximity to user interface element 702 (e.g., while satisfying the snapping criteria), graphical representation of a programming object 706 replaces (and snaps to) user interface element 702. Graphical representation of a programming object 708 is optionally deleted from the computer-generated environment or alternatively remains in the computer-generated environment unmoored from the programming structure 700. It is understood that although FIG. 7 illustrates replacing a trigger type programming object that similar behavior may occur when replacing other programming object types in the programming structure.

Figure 8:
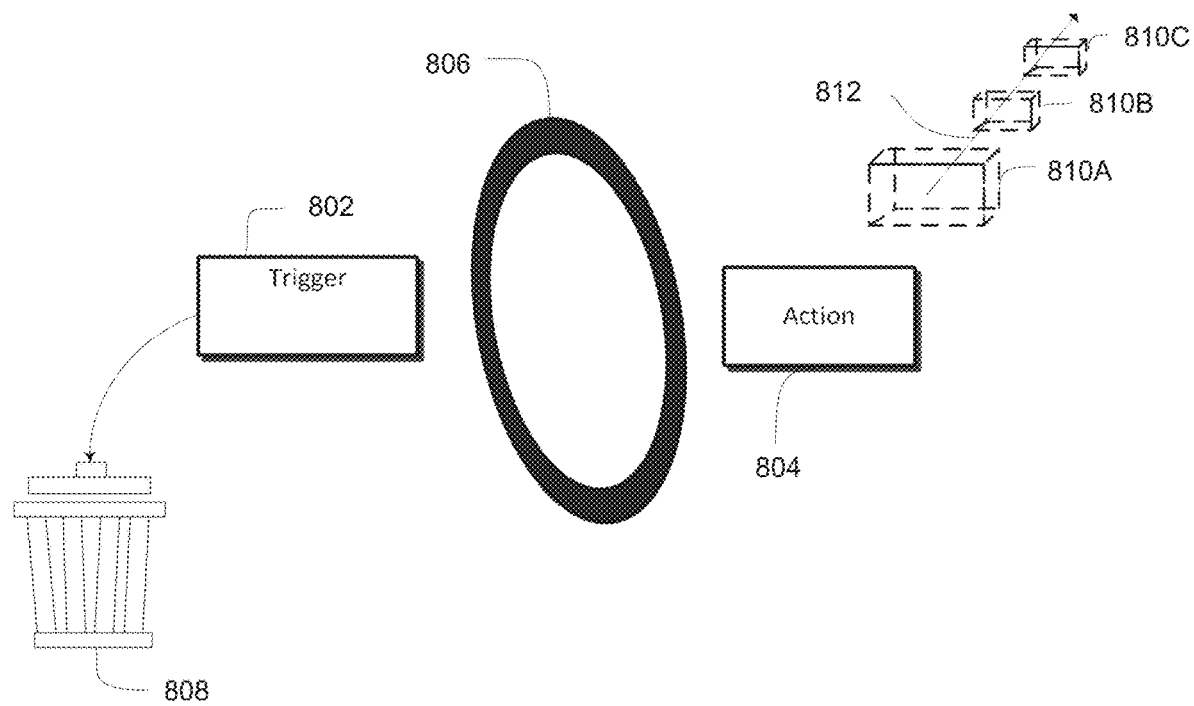
FIG. 8 illustrates an example of deleting a programming object according to some embodiments of the disclosure.

In some embodiments, a programming object may be deleted from the programming structure. FIG. 8 illustrates an example of deleting a programming object according to some embodiments of the disclosure. FIG. 8 illustrates a computer-generated environment including a programming structure 800 optionally including a first user interface element 802, a second user interface element 804, and a third user interface element 806 (e.g., corresponding to programming structures 300, 400, 500, 700 and user interface elements 302/402/502/702, 304/404/504/704, and 306/406/506/706, respectively, of FIGS. 3-5 and 7). In some embodiments, the computer-generated environment optionally includes a representation of a trash container 808, and deleting a programming object from the computer-generated environment or from the programming structure 800 comprises a "click-and-drag" operation. A trash container is sometimes called a trash, trash affordance, trash can, trash bin, so forth. For example, the "click-and-drag" operation optionally includes an input selecting a respective programming object, moving the respective programming object to the representation of the trash 808 (as indicated by the arrow between the programming object (e.g., trigger) in user interface element 802), and deselecting the respective programming object over the trash 808 (or within a threshold distance of the trash). In some embodiments, the input to delete the programming item is the same or similar as adding a programming object (e.g., modified for the different start point and/or end point for deleting versus adding). In some embodiments, programming structure 800 can be deleted by deleting third user interface element 806 (e.g., due to the remaining user interface elements being anchored to the third user interface element 806).

In some embodiments, a delete gesture is used to delete a programming object. For example, the delete gesture can include selecting a programming object (or selecting the programming structure by selecting user interface element 806), and while the programming object is selected, mimicking throwing the programming object away. In some embodiments, throwing the selected programming object away corresponds to movement (e.g., by the hand/representation of a hand) optionally greater than a threshold distance, optionally in a predetermined direction, and/or optionally above a threshold speed at the time of release. In some embodiments, the predetermined direction is away from the programming structure 800 (e.g., into the distance in the computer-generated environment, behind the user or off to the left/right side). For example, FIG. 8 illustrates an animation of a programming object (e.g., action) being selected from user interface element 804 being thrown in a trajectory illustrated by arrow 812 (with representations of the programming object 810A-810C showing the movement progressing along the trajectory with the appearance of the object changing as the programming object moves away from the user). In some embodiments, the threshold distance, threshold speed and/or predetermined direction are criteria for the delete gesture to differentiate the delete gesture from an input to move a programming object within the user interface.

Figure 9:
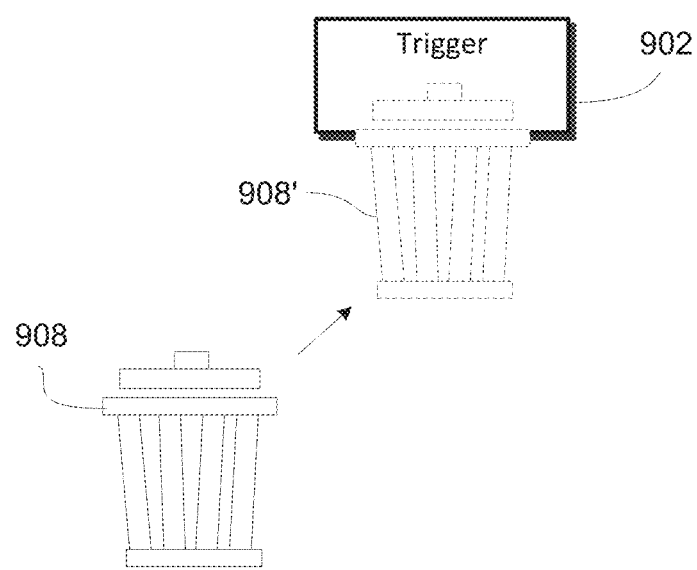
FIG. 9 illustrates an example of deleting a programming object according to some embodiments of the disclosure.

In some embodiments, the representation of the trash displayed in the computer-generated environment may be used to delete programming objects and/or programming structures in the computer-generated environment. FIG. 9 illustrates an example of deleting a programming object according to some embodiments of the disclosure. For example, the representation of the trash 908 may be moved in the computer-generated environment (e.g., using a click-and-drag input) and may delete programming objects in proximity to or contacted by the representation of the trash 908 while the trash is selected (before the trash in deselected/released). For example, an input may select (e.g., using a pinch) the representation of the trash 908 and move the trash from an initial position to a position at least partially overlapping/contacting a programming object (e.g., optionally above a threshold amount of overlapping/contacting) and/or to a position within a threshold distance of the programming object. For example, representation of the trash 908' illustrates movement of the trash (as shown by the arrow) from its initial position to a position at least partially overlapping (or fully overlapping or within a threshold distance of) a representative programming object 902 (e.g., trigger). In response, the representative programming object 902 is deleted from the computer-generated environment. In some embodiments, a programming structure is deleted by bringing the representation of the trash 908 over or within a threshold distance of the third user interface element of the programming structure. In some embodiments, in addition to contact and/or proximity, the representation of the trash 908 must dwell for a threshold duration before deleting and object (e.g., to avoid deleting objects based on unintended proximity/contact). In some embodiments, upon releasing the representation of the trash 908, the representation of the trash 908 remains at the position at which it is released in the computer-generated environment. In some embodiments, upon releasing the representation of the trash 908, the representation of the trash 908 returns to its original position at the start of the input or moves to an updated position proximate to the position at release, but without obscuring remaining programming objects/structures in the computer-generated environment.

In some embodiments, actuating the representation of the trash 908 can cause the representation of the trash 908 to sweep through the computer-generated environment and delete stray programming objects. For example, orphaned programming objects that are not part of programming structures (or otherwise contained in a user interface element) and/or empty programming structures are deleted in response to actuating the representation of the trash 908. Additionally or alternatively, in some embodiments, incomplete programming structures (e.g., those that do not include a valid trigger and action at a minimum) are deleted in response to actuating the representation of the trash 908. In some embodiments, the representation of the trash 908 can be animated moving automatically about the computer-generated environment contacting and deleting these orphaned programming objects, empty programming structures and/or incomplete programming structures.

Figure 10:
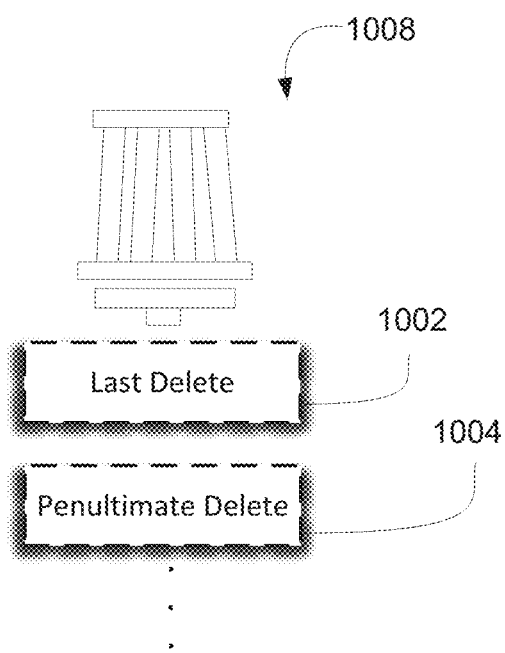
FIG. 10 illustrates an example of undoing a deletion of a programming object according to some embodiments of the disclosure.

In some embodiments, input to the representation of the trash can be used to undo a deletion of a programming object and/or programming structure. FIG. 10 illustrates an example of undoing a deletion of a programming object according to some embodiments of the disclosure. For example, the representation of the trash 1008 may be turned over in the computer-generated environment (e.g., using a selection and a rotation input). In some embodiments, turning the representation of the trash 1008 over optionally displays a representation of one or more prior deletion actions. For example, FIG. 10 illustrates a graphical representation 1002 of a last deletion operation, a graphical representation 1004 of a penultimate deletion operation, etc. In some embodiments, some or all prior deletion actions are represented in graphical form and user input selecting the graphical representations (e.g., graphical representation 1002, 1004, etc.) restores the programming objects/structures. In some embodiments, the user input selecting the graphical representations includes a tap by a finger/hand or a representation of a finger/hand. In some embodiments, the graphical representation includes a textural representation. In some embodiments, the graphical representation includes the graphical representation of the deleted programming object and/or programming structure.

In some embodiments, while the representation of the trash 1008 is held upside-down (e.g., and while the representation of the trash 1008 remains selected), each input in a predetermined direction (optionally by a threshold amount and/or with a threshold speed) undoes a previous deletion. For example, in some embodiments, shaking the upside-down representation of the trash one or more times may undo one or more prior delete operations (optionally undoing one delete operation each time the representation of the trash 1008 moves in the predetermined direction). In some embodiments, the representation of the trash 1008 must move in the opposite direction (e.g., upward) in between each downward movement before a subsequent undo operation is possible (e.g., requiring a movement in the opposite direction to enable further undo deletion operations).

Figure 11:
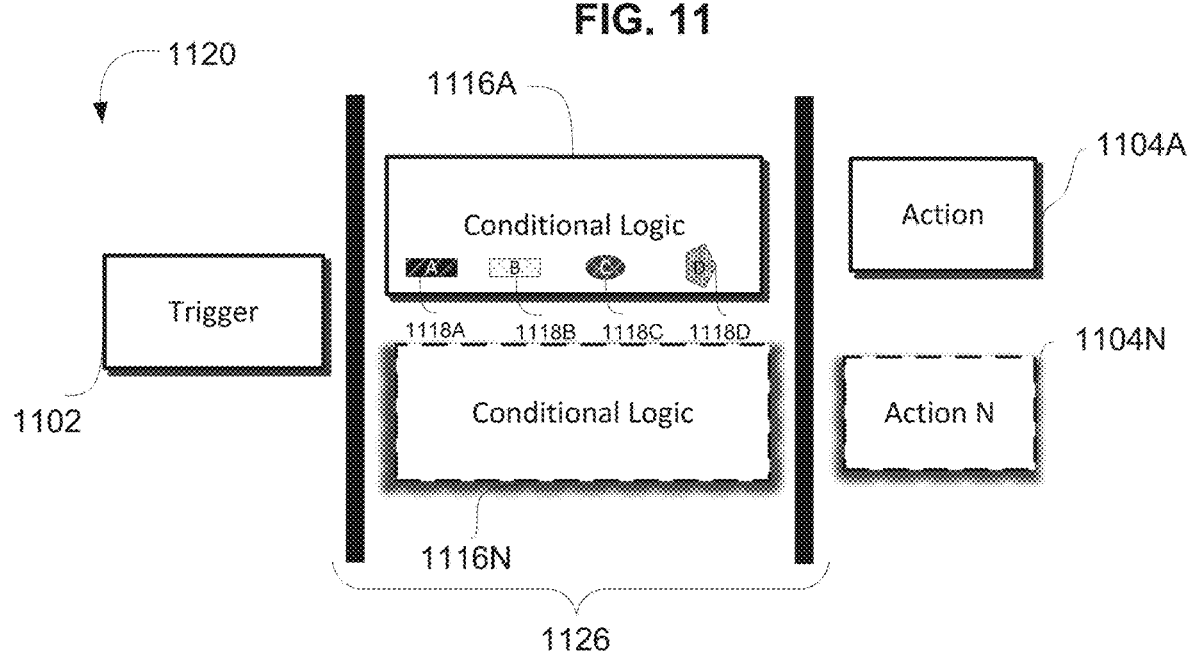
FIG. 11 illustrates an example contracted view and an example expanded view of a programming structure according to some embodiments of the disclosure.
Figure 11:
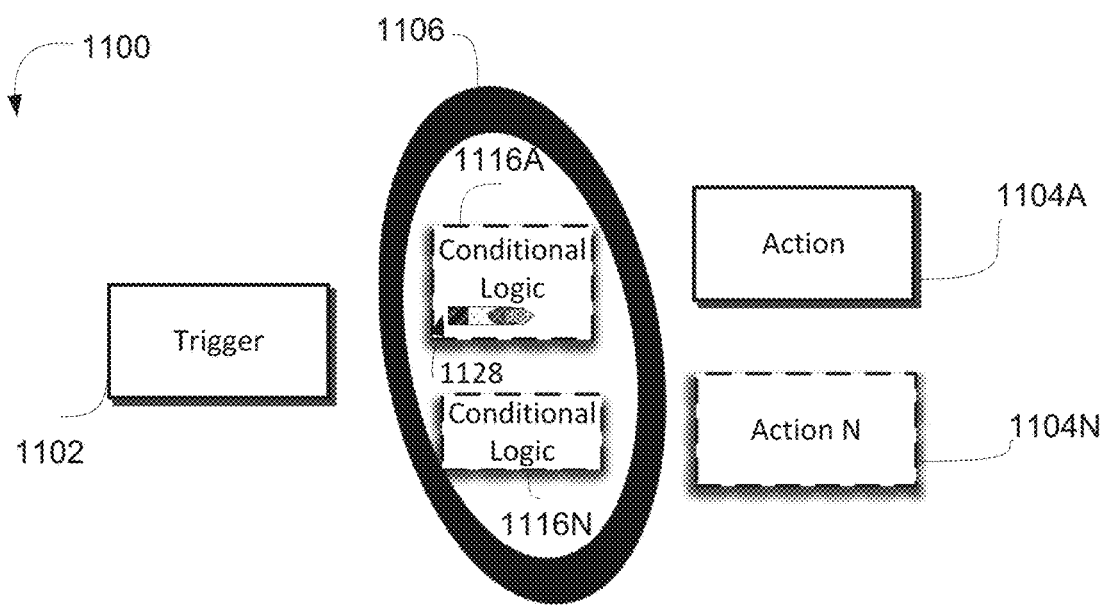

In some embodiments, the programming structure can viewed in an expanded form or a contracted form. The expanded view may be useful for creating and editing programming structures, particularly those with a large number of triggers and/or actions and/or with the complex conditional logic. A contracted view may be useful to reduce clutter in the computer-generated environment. In the contracted view, the graphical representations of the triggers, actions and/or conditional logic may be condensed as described more detail below. FIG. 11 illustrates an example contracted view 1100 and an example expanded view 1120 of a programming structure according to some embodiments of the disclosure. The expanded view 1120 and contracted view 1100 share the same programming objects, such as a trigger 1102 (e.g., in a user interface element configured to accept a trigger programming object), one or more actions 1104A-1104N (e.g., in user interface elements configured to accept action programming objects), and conditional logic 1116A-1116N (e.g., in user interface elements configured to accept conditional logic programming objects).

In the expanded view 1120, however, the relationship between the trigger(s) and action(s) can be expressed in a different form than in the contracted view 1100. In the expanded view 1120, the link between the trigger(s) and action(s) can be represented by graphical representations of conditional logic 1116A-1116N that are expanded compared with the graphical representations of conditional logic 1116A-1116N that are condensed. For example, conditional logic 1116A-1116N in the expanded view may be represented by a plurality of graphical representations of programming objects including, but not limited to, functions, Boolean operators, variables, pointers to objects, states (e.g., of the electronic device or the computer-generated environment), operating modes, etc. In some embodiments, each of type of programming objects in the conditional logic statement can be represented using a different graphical representation (e.g., using different colors, shapes, etc.) In some embodiments, in the expanded view, the graphical representation of the programming objects includes a textual representation of the details of the programming object. An example of a plurality of graphical representations of programming objects is illustrated in FIG. 11 by graphical representations 1118A-1118D, with different shading representing different appearances and text letters "A"-"D" representative of an optional textual representation. In some embodiments, in the contracted view 1100, the conditional logic 1116A-1116N may be represented by a contracted representation of the plurality of graphical representations of programming objects (e.g., by shrinking, compressing or merging the graphical representations). In some embodiments, the textual representation of the details of the programming objects are removed or compressed in the contracted view. In some embodiments, the colors and/or shapes of the graphical representations of the programming objects are maintained to preserve a high-level visual representation of the types of programming objects in the conditional logic statements (and the order of the representations of the programming objects). For example, FIG. 11 illustrates a compressed graphical representation 1128 of the graphical representations 1118A-1118D of conditional logic 1116A. The compressed graphical representation 1128 of FIG. 11 preserves the general shape, shading and/or ordering, but with compresses the graphical representations 1118A-1118D such that they are of a smaller size, merged (e.g., removing space between the graphical representations 1118A-1118D and/or overlapping the graphical representations to partially occlude the graphical representations 1118A-1118D), and removing the textual representation. This condensed and/or expanded representations may provide an improvement over node graphs in that they provide a visual indication of the behavior of the conditional logic (or, more generally, of the programming structure) and/or of the complexity of the behavior of the condition logic (e.g., via the various colors, shapes, etc.), whereas node graphs provide a far more complex picture of the relationships between nodes that may be difficult to understand.

In some embodiments, the trigger(s) 1102 and action(s) 1104A-1104N are also expanded in the expanded view and/or contracted in the contracted view. Additionally, or alternatively, the trigger and/or action programming objects and/or the user interface elements configured to receive trigger and/or action programming objects can be represented using a different graphical representation (e.g., using different colors, shapes, etc.) to differentiate between different types of programming objects.

Additionally or alternatively, in the contracted view 1100, the conditional logic 1116A-1116N may be represented in a user interface element 1106 (e.g., a ring), whereas in the expanded view 1120, the conditional logic 1116A-1116N may be represented in a different user interface element. For example, in expanded view 1120, the conditional logic is displayed between segments of user interface element 1126. In some embodiments, the segments are linear or planar, among other possibilities.

In some embodiments, in the contracted view 1110 (or in the various other representations of the linking element using a ring), an input to rotate the ring can cause the conditional logic and associated triggers/actions to rotate along with user interface element 1106 to enable improved viewing of the various conditional logic and triggers/actions of the programming structure (e.g., because some of the conditional logic, triggers and/or actions may occlude others of the conditional logic, trigger and/or actions). In some embodiments, the input comprises selecting user interface element 1106 and movement in a predetermined direction. In some embodiments, the movement in the predetermined direction follows the shape of user interface element 1106 (e.g., following the curvature of the ring).

In some embodiments, the behavior (trigger/action) defined by the programming structure can be previewed and/or debugged in the computer-generated environment. In some embodiments, a user input can be used to trigger a preview of a programming structure. For example, the user input can include using two hands (or representations of two hands) with open palms compressing the programming structure (e.g., open palms on opposite sides of the programming structure facing each other and converging toward one another over the programming structure). In response to the input, the electronic device simulates the trigger(s) and/or conditional logic to show the action, and optionally changes or enhances the appearance of the trigger, conditional logic, action and/or object during the simulation.

Figure 12:
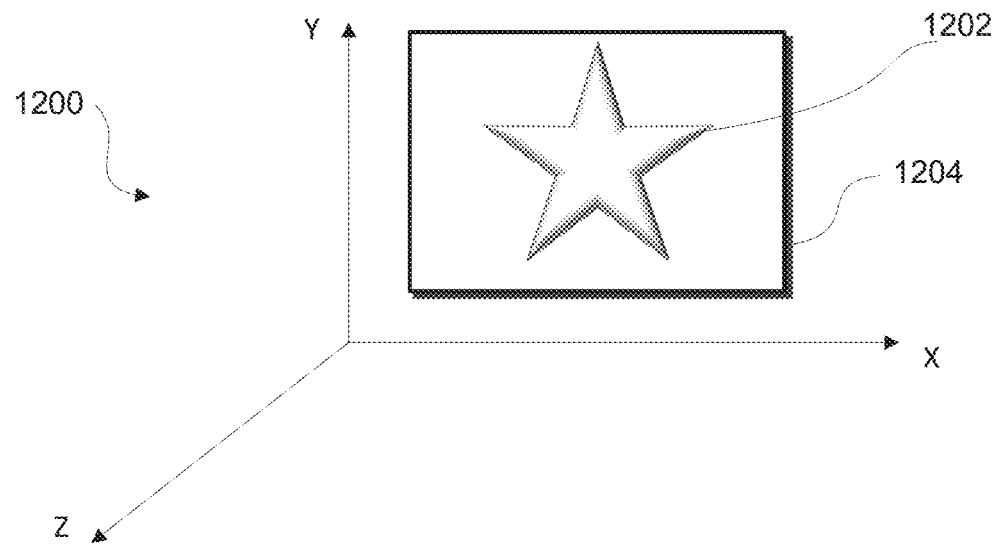
FIG. 12 illustrates a representation of a control user interface element in a computer-generated environment according to some embodiments of the disclosure.

In some embodiments, a user input can be used to toggle to a preview/debug mode. In the preview/debug mode, the user may interact with the computer-generated environment to initiate triggers and/or view the corresponding actions. In some embodiments, the programming structures/programming objects cease being displayed in the computer-generated environment in the preview/debug mode. In some embodiments, the programming structures/programming objects are again displayed upon returning to a programming/editing mode. In some embodiments, a control user interface element is displayed in the computer-generated environment and a user input to toggle to the preview/debug mode or from the preview/debug mode by actuating the control user interface element (e.g., by tapping the control user interface element, etc.). For example, the control user interface element may be represented using a graphical representation of playback controls with a "play" button for toggling to the preview/debug mode and a "pause" button for toggling from the preview/debug mode. In some embodiments, only one control user interface element is displayed. For example, a "play" button for toggling from the programming/editing mode to the preview/debug mode. When actuated, the "play" button may be replaced by a "pause" button for toggling from the preview/debug mode to the programming/editing mode. FIG. 12 illustrates a representation of the control user interface element in a computer-generated environment according to some embodiments of the disclosure. As illustrated in FIG. 12, the representation 1202 of a control user interface element, illustrated as a star, is displayed in computer-generated environment 1200. Although illustrated as a star, it is understood that the representation 1202 of the control user interface element may have a different appearance (e.g., a play and/or pause button). Additionally, it is understood that in a three-dimensional enhanced reality environment that representation 1202 of the control user interface element is optionally a two-dimensional representation or optionally a three-dimensional representation.

In some embodiments, representation 1202 of a control user interface element is anchored to a user interface element in the computer-generated environment, a real-world object, or a representation of a real-world object in the computer-generated environment. For example, representation 1202 of a control user interface element may be displayed anchored to user interface element 1204 (e.g., a window, pane or container) in the computer-generated environment. In such embodiments, movement of the user interface element 1204 in the computer-generated environment causes movement of the representation 1202 of a control user interface element that follows the movement of the user interface element 1204. It is understood that although the representation 1202 of a control user interface element is illustrated over user interface element 1204 that the representation 1202 of a control user interface element may be anchored such that it is proximate to (and not necessarily over) the user interface element 1204. In some embodiments, the representation 1202 of a control user interface element is anchored to a real-world surface (e.g., a planar surface such as a wall or table-top). In some embodiments, a representation of a real-world object includes a representation of a user's hand. In some such embodiments, user interface element 1204 comprises the representation of the user's hand, and representation 1202 of a control user interface element is displayed anchored (e.g., on or in proximity) to the representation of the user's hand. For example, movement of the user's hand may be tracked (e.g., by hand-tracking sensor(s) 202 and/or image sensor(s) 206), and the display generation component updates the display to move the virtual representation of the control user interface element to track the change in position of the hand or representation of the hand within the computer-generated environment.

Figure 13:
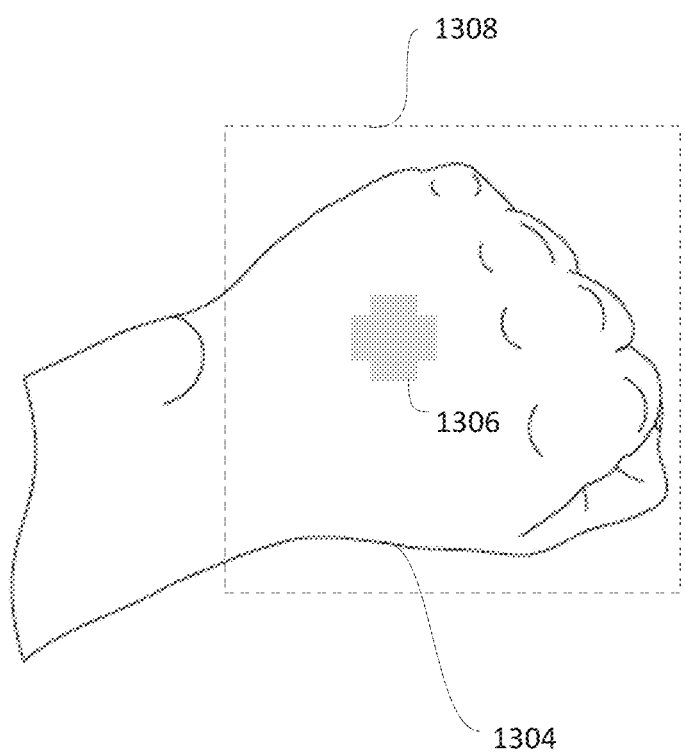
FIG. 13 illustrates an example input to display a control user interface element according to some embodiments of the disclosure.

In some embodiments, first user input may be required to trigger display of the control user interface element to toggle to the preview mode, and a second user input (e.g., as described above) is used to actuate the control user interface element. FIG. 13 illustrates an example input to display a control user interface element according to some embodiments of the disclosure. In some embodiments, an input to display the control user interface element comprise an input via a hand 1304 (or a representation of hand 1304). In some embodiments, in accordance with the input satisfying one or more criteria, the control user interface element is displayed. In some embodiments, in accordance with the input not satisfying the one or more criteria the control user interface element is not displayed. In some embodiments, the one or more criteria include a pose criterion that is satisfied when the hand is in a predetermined pose (and not satisfied when the hand is not in the predetermined pose). In some embodiments, the one or more criteria include an orientation criterion that is satisfied when the hand is in a predetermined orientation (and not satisfied when the hand is not in the predetermined orientation). In some embodiments, the one or more criteria include a position criterion that is satisfied when the hand is in a predetermined position (and not satisfied when the hand is not in the predetermined position). In some embodiments, the one or more criteria include a hand identity criterion that is satisfied when the hand has a predetermined identity (and not satisfied when the hand is not of the predetermined identity). In some embodiments, all of the above one or more criteria are required to trigger display of the control user interface element. In some embodiments, some (a subset) of the above one or more criteria are required to trigger display of the control user interface element.

In some embodiments, the predetermined pose is hand 1304 making a fist as shown in FIG. 13. In some embodiments, the pose of the hand may be determined using hand-tracking sensor(s) 202 or another input device (e.g., touch profile on an input device). In some embodiments, the predetermined pose may be another pose of the hand different from a fist. In some embodiments, detecting the fist may be based on an estimated volume of the hand (e.g., the volume of the hand may be less than a threshold when making a fist). In some embodiments, detecting the fist may be based on the position and/or orientation of fingers. For example, adjacent fingers are in contact in a fist (e.g., thumb contacts index finger, index finger contacts middle finger, middle finger contacts ring finger, ring finger contacts pinky). As another example, the closing of the fist can be detected based on the orientation of the distal, intermediate and proximal phalanges (e.g., intermediate phalanges of at least four fingers are perpendicular (or within a threshold of being perpendicular) in orientation to distal and/or proximal phalanges, and/or the distal and proximate phalanges are parallel (or within a threshold of being parallel) in orientation, etc.).

In some embodiments, the orientation of the hand may be in a specified direction (or within a threshold of the specified direction) to trigger activation (e.g., corresponding to the back of the hand facing the user's head). In some embodiments, the orientation of the hand may be determined using hand-tracking sensor(s) 202 or another input device (e.g., orientation sensor of an input device held by the user). In some embodiments, the specified direction can be defined relative to a sensor of the device. For example, one or more sensor(s) (e.g., image sensor(s) 210) and/or hand-tracking sensor(s) 202) are used, in some embodiments, to determine an orientation of the hand. In some embodiments, the orientation criterion is satisfied when a normal vector oriented outward from the dorsal aspect of the hand (e.g., back of the hand, opposite the palm) is oriented in the same (or within a threshold of the same) direction as a vector between the hand and the device (or sensor of the device) where the device is disposed in proximity to a user's head or eyes, such that satisfying the orientation criterion corresponds to the hand (e.g., the normal of the dorsal aspect) being oriented toward the head or eyes.

In some embodiments, the position of the hand may be in a specified region to trigger display of the control user interface element. In some embodiments, to satisfy the position criterion, the hand is within a threshold distance of the user. For example, the length of the vector between the hand and the sensor/device may be less than a threshold to trigger the display of the control user interface element. In some embodiments, to satisfy the position criterion, the position of the hand may be within a field of view of one or more sensors (e.g., the one or more image sensor(s) 206, or proximity sensors or hand tracking sensor(s) 202, etc.) or within the field of view (or a predefined interaction area) presented to the user via the display generation component.

In some embodiments, the identity of the hand may be a specified hand (e.g., a predetermined hand) to satisfy the hand identity criterion. For example, in some embodiments, the predetermined pose of a non-dominant hand may display the control user interface element, whereas the predetermined pose of a dominant hand may not display the control user interface element. For example, a handedness of the user may be determined (e.g., based on user input designating a dominant hand, and/or based on monitoring the frequency of use of each hand for input to the device), and a left-hand input (but not right-hand input) may display the control user interface element for a right-hand dominant user, and a right-hand input (but not left-hand input) may display the control user interface element for a left-hand dominant user. In some embodiment, the control user interface element may be displayed by either hand of the user (e.g., independent of the identity of the hand).

In some embodiments, the one or more criteria optionally include a gaze criterion. For example, in some embodiments, the gaze criterion is satisfied when the user directs gaze on the hand 1304, or within a sub-region of the hand (e.g., centered at or around indicator 1306), or within a threshold region 1308 including hand 1304 (e.g., in the general direction of hand 1304). In some embodiments, the gaze criterion is satisfied when the gaze is directed at hand 1304 or a representation of the hand 1304 (or a sub-region of the hand or within a threshold region 1308) optionally displayed in the computer-generated environment. In some embodiments, the gaze criterion is satisfied when the gaze rests for a threshold period of time on the hand or the designated region including the hand or a sub-region of the hand.

In some embodiments, the one or more first criteria optionally include a timing criterion. The timing criterion is satisfied when some (a subset) or all of the above criteria are detected for a threshold period of time.

In some embodiments, some or all of the above criteria are required to initially trigger display of the control user interface element, but fewer of the above first criteria are required to maintain the display of the control user interface element. For example, gaze (optionally for a threshold duration) may be required to display the control user interface element, but the control user interface element can remain displayed without maintaining gaze. In some embodiments, the predetermined position and/or orientation of the hand may be required to display the control user interface element, but the control user interface element can remain displayed without maintaining the position and/or orientation of the hand. In some embodiments, fewer of the first criteria may be required to re-display the control user interface element within a threshold period of time after ceasing to display the control user interface element (e.g., to make it easier to re-invoke the control user interface element a short period of time after having met the criteria to invoke the control user interface element).

In some embodiments, the preview/debug capability is always on. In such embodiments, as soon as a programming structure is created and/or populated with triggers and/or actions, an input that triggers the action in the computer-generated environment will cause the associated action to be performed in response. In some such embodiments, when a behavior of a trigger/action takes place, the appearance of the corresponding programming structure may be enhanced or otherwise change (e.g., change in size, shape, color, lighting effect, halo, etc.). In some embodiments, a specific path between trigger and action (e.g., via conditional logic) may also be highlighted for the programming structure that corresponds to the path taken for the behavior to be performed.

It is understood that a computer-generated environment may include multiple programming structures (e.g., corresponding to programming structure 300), though for simplicity of description one programming structure is often illustrated and described herein. In some embodiments, the programming structures may be placed in the computer-generated environment by the user and can be distributed throughout the computer-generated environment. A user may change the position of the programming structures in the computer-generated environment using a "click-and-drag" input. In some embodiments, a programming structure may automatically move closer to an associated object when the programming structure is associated with the object. In some embodiments, the programming structure may automatically move closer to an object associated with the action and move to a position between the object associated with the action and a different object associated with the trigger. Automatically moving program structures provides a user with a more intuitive understanding of the relationship between programming structures and objects in the computer-generated environment.

Figure 14:
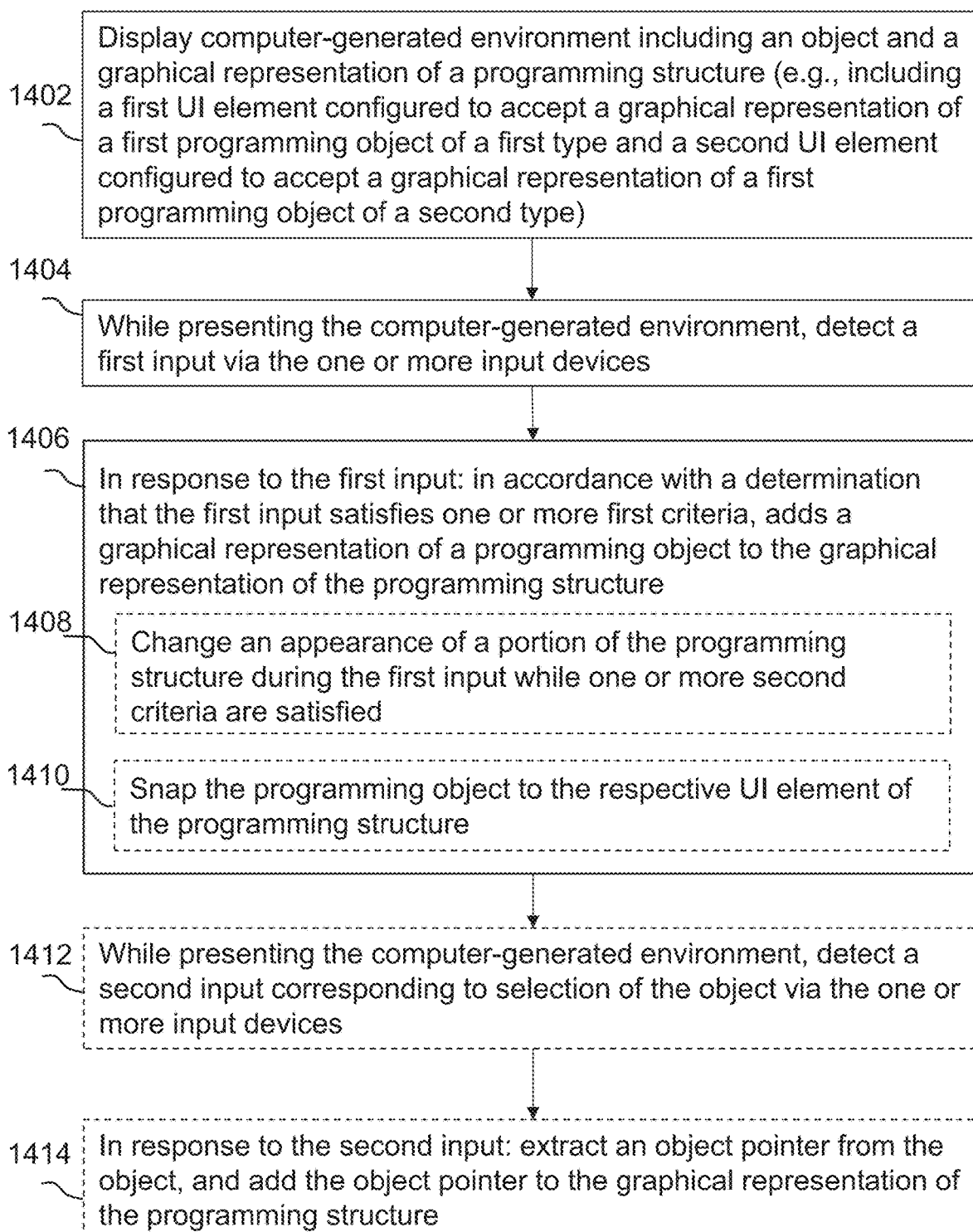
FIG. 14 illustrates an example process for visual programming in a computer-generated environment in accordance with some embodiments of the disclosure.

FIG. 14 illustrates an example process 1400 for visual programming in a computer-generated environment in accordance with some embodiments of the disclosure. Process 1400 is optionally performed at an electronic device such as device 100, device 200 or device 250. Some operations in process 1400 are optionally combined and/or optionally omitted. The order of some operations in process 1400 is optionally changed, in some embodiments.

In some embodiments, operations of process 1400 are performed at an electronic device in communication with a display generation component and one or more input devices. At 1402, the electronic device displays a computer-generated environment via the display generation component (e.g., display generation component(s) 214). The computer-generated environment optionally includes an object and a graphical representation of a programming structure. The graphical representation of a programming structure, in some embodiments, includes a first user interface element (e.g., first user interface element 110, 302, 402, 502, 702, 802, 1102) configured to accept a graphical representation of a first programming object of a first type (e.g., a trigger) and a second user interface element (e.g., second user interface element 112, 304, 404, 504, 704, 804, 1104A) configured to accept a graphical representation of a first programming object of a second type (e.g., an action). While presenting the computer-generated environment, a first input is detected, at 1404, via the one or more input devices. At 1406, in response to the first input, in accordance with a determination that the first input satisfies one or more first criteria, the electronic device adds a graphical representation of a programming object to the graphical representation of the programming structure. In response to the first input, in accordance with a determination that the first input fails to satisfy the one or more first criteria, the electronic device forgoes adding the graphical representation of the programming object to the graphical representation of the programming structure.

Additionally or alternatively to one or more of the embodiments disclosed above, in some embodiments, the graphical representation of the programming structure includes: a third user interface element (e.g., third user interface element 114, 306, 406, 506, 706, 806, 1106) linking the first user interface element and the second user interface element.

Additionally or alternatively to one or more of the embodiments disclosed above, in some embodiments, the first input comprises: a selection, a movement, and a deselection. Additionally or alternatively to one or more of the embodiments disclosed above, in some embodiments, the one or more first criteria comprises a first criterion that is satisfied when the graphical representation of the programming object is within a threshold distance of a respective user interface element of the programming structure configured to accept the graphical representation of the programming object, and the one or more first criteria comprises a second criterion that is satisfied when a type of the graphical representation of the programming object matches a type of the respective user interface element of the programming structure configured to accept the graphical representation of the programming object. Additionally or alternatively to one or more of the embodiments disclosed above, in some embodiments, in response to satisfying the first criterion and/or the second criterion while the graphical representation of the programming object is selected, the electronic device changes, at 1408 an appearance of a portion of graphical representation of the programming structure. Additionally or alternatively to one or more of the embodiments disclosed above, in some embodiments, adding the graphical representation of the programming object to the graphical representation of the programming structure comprises, at 1410, snapping the graphical representation of the programming object to the respective user interface element of the programming structure.

Additionally or alternatively to one or more of the embodiments disclosed above, in some embodiments, the computer-generated environment includes graphical representations of a plurality of programming objects displayed concurrently with and separate from the programming structure (e.g., in a user interface element 420, 424). In some such embodiments, the first input comprises selecting the graphical representation of the programming object from the displayed plurality of programming objects.

Additionally or alternatively to one or more of the embodiments disclosed above, in some embodiments, adding the graphical representation of the programming object to the graphical representation of the programming structure comprises removing a graphical representation of another programming object from the graphical representation of the programming structure (e.g., as shown in FIG. 7 by graphical representation of a programming object 708 being replaced by a graphical representation of a programming object 710).

Additionally or alternatively to one or more of the embodiments disclosed above, in some embodiments, while displaying the computer-generated environment, the electronic device detects, at 1412, via the one or more input devices, a second input including selection of the object. In some embodiments, in response to the second input, the electronic device, at 1414, extracts an object pointer from the object, and adds the object pointer to the graphical representation of the programming structure (e.g., optionally based on movement and/or releasing the object pointer in proximity to a user interface element of the programming structure). Additionally or alternatively to one or more of the embodiments disclosed above, in some embodiments, in response to the second input, the electronic device moves the graphical representation of the programming structure toward the object (e.g., in response to adding the object pointer to the programming structure).

Additionally or alternatively to one or more of the embodiments disclosed above, in some embodiments, the computer-generated environment includes a graphical representation of a trash. While displaying the computer-generated environment, the electronic device optionally detects, via the one or more input devices, a second input including interaction with the graphical representation of the trash. In response to the second input, the electronic device deletes the graphical representation of a programming object from the graphical representation of the programming structure (e.g., ceases to display the deleted object). Additionally or alternatively to one or more of the embodiments disclosed above, in some embodiments, while displaying the computer-generated environment, the electronic device detects, via the one or more input devices, a third input including interaction with the graphical representation of the trash. In response to the third input, the electronic device restores the graphical representation of a programming object deleted from the graphical representation of the programming structure to the graphical representation of the programming structure.

Additionally or alternatively to one or more of the embodiments disclosed above, in some embodiments, while displaying the computer-generated environment, the electronic device optionally detects, via the one or more input devices, a second input. In response to the second input: in accordance with a determination that the second input satisfies one or more second criteria, the electronic device displays a control user interface element in the computer-generated environment; and in accordance with a determination that the second input fails to satisfy the one or more second criteria, the electronic device forgoes displaying the control user interface element in the computer-generated environment. Additionally or alternatively to one or more of the embodiments disclosed above, in some embodiments, while displaying the control user interface element in the computer-generated environment, the electronic device detects, via the one or more input devices, a third input. In response to the third input, the electronic device performs a behavior of the programming structure. Additionally or alternatively to one or more of the embodiments disclosed above, in some embodiments, the control user interface element displayed in the computer-generated environment is anchored to a hand or a representation of the hand displayed in the computer-generated environment. Additionally or alternatively to one or more of the embodiments disclosed above, in some embodiments, the one or more second criteria include one or more of: a first criterion that is satisfied when the hand corresponds to a predetermined hand; a second criterion that is satisfied when the hand is in a predetermined pose; a third criterion that is satisfied when the hand is oriented in a specified direction or within a threshold of the specified direction; a fourth criterion that is satisfied when the hand is within a field of view of a sensor of the electronic device; and a fifth criterion that is satisfied when a gaze is detected at or within a threshold distance of the hand.

Additionally or alternatively to one or more of the embodiments disclosed above, in some embodiments, while displaying the computer-generated environment, the electronic device detects, via the one or more input devices, a second input performed by two hands or a representation of two hands in the computer-generated environment. In response to the second input, in accordance with a determination that the second input satisfies one or more second criteria, the electronic device performs an action of the graphical representation of the programming structure.

Additionally or alternatively to one or more of the embodiments disclosed above, in some embodiments, the programming structure further includes a fourth user interface element configured to accept a graphical representation of a second programming object of the first type (e.g., a second trigger) and/or a fifth user interface element configured to accept a graphical representation of a second programming object of the second type (e.g., a second action). While displaying the computer-generated environment, the electronic device optionally detects, via the one or more input devices, a second input. In response to the second input (e.g., rotating the third user interface element), the electronic device rotates the third user interface element to change a position of the first user interface element, the second user interface element, the fourth user interface element and/or the fifth user interface element in the computer-generated environment.

Additionally or alternatively to one or more of the embodiments disclosed above, in some embodiments, the programming structure includes: a user interface element configured to accept a graphical representation of a programming object representing a trigger; a user interface element configured to accept a graphical representation of a programming object representing conditional logic; and a user interface element configured to accept a graphical representation of a programming object. Additionally or alternatively to one or more of the embodiments disclosed above, in some embodiments, the user interface element configured to accept a graphical representation of a programming object representing conditional logic is displayed in-between the user interface element configured to accept a graphical representation of a programming object representing a trigger and the user interface element configured to accept a graphical representation of a programming object representing an action. Additionally or alternatively to one or more of the embodiments disclosed above, in some embodiments, the graphical representation of the programming object representing conditional logic is disposed in the third user interface element linking the first user interface element and the second user interface element.

Additionally or alternatively to one or more of the embodiments disclosed above, in some embodiments, programming objects of the first type have a first appearance (e.g., first shape, color, etc.) corresponding to user interface elements configured to accept the programming objects of the first type, and programming objects of the second type have a second appearance (e.g., a second shape, color, etc.) corresponding to user interface elements configured to accept the programming objects of the second type. The first appearance and the second appearance are different.

Additionally or alternatively to one or more of the embodiments disclosed above, in some embodiments, while displaying the computer-generated environment, the electronic device detects, via the one or more input devices, a second input. In response to the second input, in accordance with the computer-generated environment displaying a first view of the graphical representation of the programming structure, the electronic device expands to a second view of the graphical representation of the programming structure. An appearance of programming objects in the first view is larger than the appearance of the programming objects in the second view.

It should be understood that the particular order of the description of the operations in FIG. 14 is merely exemplary and is not intended to indicate that the described order is the only order in which the operations could be performed. One of ordinary skill in the art would recognize various ways to reorder the operations described herein.

The operations of process described above are, optionally, implemented by an electronic device comprising: one or more processors; memory; and one or more programs stored in the memory. The one or more programs stored in the memory and configured to be executed by the one or more processors, cause the processor to perform any of the above operations. The operations of process described above are, optionally, implemented by a storing one or more programs. The one or more programs stored in the non-transitory computer readable storage medium and configured to be executed by the one or more processors of an electronic device, cause the processor to perform any of the above operations.

The operations of process described above are, optionally, implemented by running one or more functional modules in an information processing apparatus such as general-purpose processors (e.g., as described with respect to FIGS. 2A-2B) or application specific chips. Further, the operations described above with reference to FIG. 14 are, optionally, implemented by components depicted in FIGS. 2A-2B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
displaying, via the display, an extended reality environment, the extended reality environment including:
an object in the extended reality environment;
a graphical representation of a programming object; and
a graphical representation of a programming structure, the programming structure including a first user interface element configured to accept a graphical representation of a first programming object of a first type, a second user interface element, different from the first user interface element, configured to accept a graphical representation of a second programming object of a second type, and a third user interface element, different from the first user interface element and the second user interface element, configured to accept a graphical representation of a third programing object of a third type, wherein the first type is a trigger and the second type is an action, different from the trigger, and the third type is conditional logic linking the first user interface element and the second user interface element, and wherein the object in the extended reality environment is different from the graphical representation of the programming object and is different from the graphical representation of the programming structure;
while displaying the extended reality environment, detecting, via the one or more input devices, a first input; and
in response to the first input:
adding the graphical representation of the programming object to the graphical representation of the programming structure, wherein the graphical representation of the programming object is the graphical representation of the first programming object of the first type, the graphical representation of the second programming object of the second type, or the graphical representation of the third programming object of the third type.

2. The method of claim 1, wherein the first input comprises: a selection, a movement, and a deselection.

3. The method of claim 1, wherein adding the graphical representation of the programming object to the graphical representation of the programming structure is performed in accordance with a determination that one or more first criteria are satisfied, the one or more first criteria comprises a first criterion that is satisfied when the graphical representation of the programming object is within a threshold distance of a respective user interface element of the programming structure configured to accept the graphical representation of the programming object, and wherein the one or more first criteria comprises a second criterion that is satisfied when a type of the graphical representation of the programming object matches a type of the respective user interface element of the programming structure configured to accept the graphical representation of the programming object.

4. The method of claim 3, further comprising:
in response to satisfying the first criterion or the second criterion while the graphical representation of the programming object is selected:
changing an appearance of a portion of graphical representation of the programming structure.

5. The method of claim 3, wherein adding the graphical representation of the programming object to the graphical representation of the programming structure comprises snapping the graphical representation of the programming object to the respective user interface element of the programming structure.

6. The method of claim 1, wherein the extended reality environment includes graphical representations of a plurality of programming objects displayed concurrently with and separate from the graphical representation of the programming structure, and wherein the first input comprises selecting the graphical representation of the programming object from the graphical representations of the plurality of programming objects.

7. The method of claim 1, wherein adding the graphical representation of the programming object to the graphical representation of the programming structure in response to the first input comprises removing a graphical representation of another programming object from the graphical representation of the programming structure in response to the first input.

8. The method of claim 1, further comprising:
while displaying the extended reality environment, detecting, via the one or more input devices, a second input corresponding to selection of the object; and
in response to the second input:
extracting an object pointer from the object in the extended reality environment; and
adding the object pointer to the graphical representation of the programming structure.

9. The method of claim 1, wherein the extended reality environment includes a graphical representation of a trash, the method further comprising:
while displaying the extended reality environment, detecting, via the one or more input devices, a second input including interaction with the graphical representation of the trash; and
in response to the second input:
deleting the graphical representation of a programming object from the graphical representation of the programming structure.

10. The method of claim 9, further comprising:
while displaying the extended reality environment, detecting, via the one or more input devices, a third input including interaction with the graphical representation of the trash; and
in response to the third input:
restoring the graphical representation of a programming object deleted from the graphical representation of the programming structure to the graphical representation of the programming structure.

11. The method of claim 1, further comprising:
while displaying the extended reality environment, detecting, via the one or more input devices, a second input;
in response to the second input:
in accordance with a determination that the second input satisfies one or more second criteria, displaying a control user interface element in the extended reality environment; and
in accordance with a determination that the second input fails to satisfy the one or more second criteria, forgoing displaying the control user interface element in the extended reality environment;
while displaying the control user interface element in the extended reality environment, detecting, via the one or more input devices, a third input; and
in response to the third input:
executing a behavior of the programming structure.

12. The method of claim 11, wherein the control user interface element displayed in the extended reality environment is anchored to a hand or a representation of the hand displayed in the extended reality environment.

13. The method of claim 11, wherein the one or more second criteria are associated with a hand, the one or more second criteria including one or more of:
a first criterion that is satisfied when the hand corresponds to a predetermined hand;
a second criterion that is satisfied when the hand is in a predetermined pose;
a third criterion that is satisfied when the hand is oriented in a specified direction or within a threshold of the specified direction;
a fourth criterion that is satisfied when the hand is within a field of view of a sensor of the electronic device; and
a fifth criterion that is satisfied when a gaze is detected at or within a threshold distance of the hand.

14. The method of claim 1, further comprising:
while displaying the extended reality environment, detecting, via the one or more input devices, a second input performed by two hands or a representation of two hands in the extended reality environment; and
in response to the second input:
in accordance with a determination that the second input satisfies one or more second criteria, performing an action of the graphical representation of the programming structure.

15. The method of claim 1, wherein the programming structure further includes a fourth user interface element configured to accept a graphical representation of a third programming object of the first type or a fifth user interface element configured to accept a graphical representation of a fourth programming object of the second type, the method further comprising:
while displaying the extended reality environment, detecting, via the one or more input devices, a second input; and
in response to the second input:
rotating the third user interface element to change a position of the first user interface element, the second user interface element, the fourth user interface element or the fifth user interface element in the extended reality environment.

16. The method of claim 1, wherein programming objects of the first type have a first appearance corresponding to user interface elements configured to accept the programming objects of the first type, wherein programming objects of the second type have a second appearance corresponding to user interface elements configured to accept the programming objects of the second type, and wherein the first appearance and the second appearance are different.

17. An electronic device comprising:
a display;
one or more input devices;
one or more processors;
memory; and
one or more programs stored in the memory and configured to be executed by the one or more processors, the one or more programs including instructions for:

displaying, via the display, an extended reality environment, the extended reality environment including:
  an object;
  a graphical representation of a programming object; and
  a graphical representation of a programming structure, the programming structure including a first user interface element configured to accept a graphical representation of a first programming object of a first type and a second user interface element, different from the first user interface element, configured to accept a graphical representation of a second programming object of a second type, wherein the first type is a trigger and the second type is an action, different from the trigger, and wherein the object in the extended reality environment is different from the graphical representation of the programming object and is different from the graphical representation of the programming structure;
while displaying the extended reality environment, detecting, via the one or more input devices, a first input;
in response to the first input:
  adding the graphical representation of the programming object to the graphical representation of the programming structure, wherein the graphical representation of the programming object is the graphical representation of the first programming object of the first type or the graphical representation of the second programming object of the second type;
while displaying the extended reality environment, detecting, via the one or more input devices, a second input corresponding to selection of the object in the extended reality environment; and
in response to the second input:
  extracting an object pointer from the object in the extended reality environment; and
  adding the object pointer to the graphical representation of the programming structure.

18. The electronic device of claim 17, wherein adding the object pointer to the graphical representation of the programming structure is performed in response to third input that includes movement of the object pointer in the extended reality environment to the programming structure.

19. The electronic device of claim 17, wherein the graphical representation of the programming structure includes:
  a third user interface element linking the first user interface element and the second user interface element, wherein the third user interface element is configured to accept a graphical representation of a programming object representing conditional logic, and wherein the third user interface element is different from the first user interface element and the second user interface element.

20. The electronic device of claim 17, wherein:
adding the graphical representation of the programming object to the graphical representation of the programming structure is performed in accordance with a determination that one or more first criteria are satisfied; the one or more first criteria comprises a first criterion that is satisfied when the graphical representation of the programming object is within a threshold distance of a respective user interface element of the programming structure configured to accept the graphical representation of the programming object; and
the one or more first criteria comprises a second criterion that is satisfied when a type of the graphical representation of the programming object matches a type of the respective user interface element of the programming structure configured to accept the graphical representation of the programming object.

21. The electronic device of claim 17, the one or more programs including further instructions for:
while displaying the extended reality environment, detecting, via the one or more input devices, a second input corresponding to selection of the object; and
in response to the second input:
  extracting an object pointer from the object in the extended reality environment; and
  adding the object pointer to the graphical representation of the programming structure.

22. A non-transitory computer readable storage medium storing one or more programs, the one or more programs comprising instructions, which when executed by one or more processors of an electronic device, cause the electronic device to:
display, via a display, an extended reality environment, the extended reality environment including:
  an object in the extended reality environment;
  a graphical representation of a programming object; and
  a graphical representation of a programming structure, the programming structure including a first user interface element configured to accept a graphical representation of a first programming object of a first type and a second user interface element, different from the first user interface element, configured to accept a graphical representation of a second programming object of a second type, wherein the first type is a trigger and the second type is an action, different from the trigger, and wherein the object in the extended reality environment is different from the graphical representation of the programming object and is different from the graphical representation of the programming structure;
while displaying the extended reality environment, detect, via one or more input devices, a first input; and
in response to the first input:
  add the graphical representation of the programming object to the graphical representation of the programming structure, wherein the graphical representation of the programming object is the graphical representation of the first programming object of the first type or the graphical representation of the second programming object of the second type;
while displaying the extended reality environment, detect, via the one or more input devices, a second input;
in response to the second input:
  in accordance with a determination that the second input satisfies one or more second criteria, display a control user interface element in the extended reality environment; and
  in accordance with a determination that the second input fails to satisfy the one or more second criteria, forgo displaying the control user interface element in the extended reality environment;
while displaying the control user interface element in the extended reality environment, detect, via the one or more input devices, a third input; and in response to the third input:
  execute a behavior of the programming structure.

23. The non-transitory computer readable storage medium of claim 22, wherein the graphical representation of the programming structure includes:
  a third user interface element linking the first user interface element and the second user interface element, wherein the third user interface element is configured to accept a graphical representation of a programming object representing conditional logic, and wherein the third user interface element is different from the first user interface element and the second user interface element.

24. The non-transitory computer readable storage medium of claim 22, wherein:
  adding the graphical representation of the programming object to the graphical representation of the programming structure is performed in accordance with a determination that one or more first criteria are satisfied;
  the one or more first criteria comprises a first criterion that is satisfied when the graphical representation of the programming object is within a threshold distance of a respective user interface element of the programming structure configured to accept the graphical representation of the programming object; and
  the one or more first criteria comprises a second criterion that is satisfied when a type of the graphical representation of the programming object matches a type of the respective user interface element of the programming structure configured to accept the graphical representation of the programming object.

* * * * *